United States Patent
Camden et al.

(10) Patent No.: US 11,259,389 B1
(45) Date of Patent: Feb. 22, 2022

(54) REAL TIME LOCATING SYSTEM HAVING LIGHTING CONTROL DEVICES

(71) Applicant: Lutron Technology Company LLC, Coopersburg, PA (US)

(72) Inventors: Richard S. Camden, Coopersburg, PA (US); Vidur Garg, Allentown, PA (US); Jeffrey S. Hayes, Allentown, PA (US)

(73) Assignee: Lutron Technology Company LLC, Coopersburg, PA (US)

(*) Notice: Subject to any disclaimer, the term of this patent is extended or adjusted under 35 U.S.C. 154(b) by 0 days.

(21) Appl. No.: 17/112,706

(22) Filed: Dec. 4, 2020

(51) Int. Cl.
*H05B 47/155* (2020.01)
*H05B 47/105* (2020.01)
*H05B 47/19* (2020.01)

(52) U.S. Cl.
CPC ......... *H05B 47/105* (2020.01); *H05B 47/155* (2020.01); *H05B 47/19* (2020.01)

(58) Field of Classification Search
CPC .... H05B 47/19; H05B 47/105; H05B 47/155; H05B 47/195; H05B 47/175; H04W 4/021; H04W 4/33; H04B 17/318; H04L 12/2803; H04L 12/2814; H04L 12/2816; G05F 1/66; Y02B 20/40
See application file for complete search history.

(56) References Cited

U.S. PATENT DOCUMENTS

| | | | |
|---|---|---|---|
| 5,248,919 A | 9/1993 | Hanna et al. | |
| 8,009,042 B2 | 8/2011 | Steiner et al. | |
| 8,199,010 B2 | 6/2012 | Sloan et al. | |
| 8,228,184 B2 | 7/2012 | Blakeley et al. | |
| 8,410,706 B2 | 4/2013 | Steiner et al. | |
| 8,451,116 B2 | 5/2013 | Steiner et al. | |
| 8,471,779 B2 | 6/2013 | Mosebrook | |
| 8,928,232 B2* | 1/2015 | Aggarwal | H05B 47/175 315/153 |
| 9,345,115 B2 | 5/2016 | Mohan | |
| 9,413,171 B2 | 8/2016 | Neyhart | |
| 10,278,268 B2* | 4/2019 | Casey | G06T 5/20 |
| 10,420,185 B2* | 9/2019 | Biery | H05B 47/19 |
| 10,599,174 B2* | 3/2020 | Baker | H04W 4/021 |
| 2010/0245588 A1 | 9/2010 | Waehner et al. | |
| 2013/0030589 A1 | 1/2013 | Pessina et al. | |

(Continued)

*Primary Examiner* — Haissa Philogene
(74) *Attorney, Agent, or Firm* — Flaster Greenberg, P.C.

(57) ABSTRACT

A load control system for controlling a plurality of lighting loads located in a space may be configured to track the location of one or more tracked devices. The load control system may comprise a system controller, lighting control devices, e.g., for controlling a plurality of lighting loads, and tracked devices. The tracked devices may each transmit beacon messages. The lighting control devices may receive the beacon message. The lighting control devices may measure a communication quality metric of each of the beacon messages, and process the measured communication quality metrics received over a period of time to determine a processed communication quality metric for the tracked device. The lighting control devices may transmit tracking data to the system controller. The system controller may determine a location of the tracked device. For example, the system controller may determine the location of the tracked device via trilateration.

31 Claims, 16 Drawing Sheets

(56) References Cited

U.S. PATENT DOCUMENTS

| | | |
|---|---|---|
| 2014/0031987 A1 | 1/2014 | Ericsson et al. |
| 2014/0132475 A1 | 5/2014 | Bhutani et al. |
| 2014/0235269 A1 | 8/2014 | Ericsson et al. |
| 2015/0189068 A1 | 7/2015 | Mohan et al. |
| 2016/0054023 A1 | 2/2016 | Protzman et al. |
| 2016/0056629 A1 | 2/2016 | Baker et al. |
| 2016/0286624 A1 | 9/2016 | Patel et al. |
| 2016/0322817 A1 | 11/2016 | Baker et al. |
| 2017/0038787 A1 | 2/2017 | Baker et al. |
| 2017/0041886 A1 | 2/2017 | Baker et al. |
| 2017/0265041 A1 | 9/2017 | Mahasenan et al. |
| 2018/0054706 A1 | 2/2018 | Kastee et al. |
| 2018/0063808 A1 | 3/2018 | Mahasenan et al. |
| 2018/0203591 A1* | 7/2018 | Callen .................. G06F 3/0482 |
| 2019/0104383 A1 | 4/2019 | Keal et al. |
| 2019/0190741 A1* | 6/2019 | Wendt ................. H04L 12/2814 |
| 2019/0239025 A1 | 8/2019 | Keal |
| 2020/0037116 A1 | 1/2020 | Keal et al. |
| 2020/0287786 A1* | 9/2020 | Anderson ............ G06K 7/1413 |

\* cited by examiner

REAL TIME LOCATING SYSTEM HAVING LIGHTING CONTROL DEVICES

BACKGROUND

A user environment, such as a residence or an office building for example, may be configured using various types of load control systems. A lighting control system may be used to control the lighting loads in the user environment. A motorized window treatment control system may be used to control the natural light provided to the user environment. A heating, ventilation, and air conditioning (HVAC) system may be used to control the temperature in the user environment.

Each load control system may include various control devices, including control-source devices and control-target devices. The control-target devices may receive messages (e.g., digital messages), which may include commands (e.g., control instructions, such as load control instructions), for controlling an electrical load from one or more of the control-source devices. The control-target devices may be capable of controlling an electrical load. The control-source devices may be capable of controlling the electrical load via the control-target device. Examples of control-target devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of control-source devices may include remote control devices, occupancy sensors, daylight sensors, temperature sensors, and/or the like.

Although control-source devices may be capable of controlling a control-target device, a control-source device may not be capable of controlling a control-target device, based on a user location and/or a mobile device. For example, a control-source device may not be capable of setting a control-target device to a lighting intensity, based on a user and/or mobile device located within the load control system. This may be desirable, for example, for users located in an office that may desire to have a lighting intensity, temperature level, and/or natural light provided at a predefined level.

SUMMARY

A load control system for controlling a plurality of lighting loads located in a space may be configured to provide real time location services. For example, the load control system may be configured the track the location of one or more tracked devices throughout the load control system. The load control system may comprise a system controller that is configured to transmit messages for controlling one or more of a plurality of lighting loads. For example, the messages for controlling the lighting load may be transmitted to a lighting control device configured to control a respectively lighting load via a wireless communication network. Each of the plurality of lighting control devices that receive the messages from the system controller may be configured to control at least one of the plurality of lighting loads in response to the message.

The location of one or more tracked devices may be tracked throughout the load control system. The tracked devices may be configured to transmit beacon messages, which may be used to track the location of a respective tracked device. Each of the plurality of lighting control devices may be further configured to receive beacon messages from a tracked device. For example each of the beacon messages may include a beacon identifier of the tracked device. Each of the plurality of lighting control devices may measure a communication quality metric of each of the beacon messages. Each of the plurality of lighting control devices may process the measured communication quality metrics of each of the beacon messages received over a period of time to determine a processed communication quality metric for the tracked device. The processed communication quality metric for the tracked device may be a maximum of the measured communication quality metrics of each of the beacon messages received over the period of time. For example, the processed communication quality metric for the tracked device may be an average of the measured communication quality metrics of each of the beacon messages received over the period of time.

Each of the plurality of lighting control devices may be further configured to determine a path loss value for the tracked device, wherein the determined path loss value is based on the processed communication quality metric for each of the beacon messages received over the period of time. For example, the tracking data transmitted by the each of the plurality of lighting control devices may further include the path loss value of the tracked device. Each of the plurality of lighting control devices may be further configured to determine a transmit power associated with the tracked device. For example, the tracking data transmitted by each of the plurality of lighting control devices may further include the transmit power associated with the tracked device.

Each of the plurality of lighting control devices may be configured to transmit tracking data to the system controller. For example, the tracking data may include the beacon identifier of the tracked device and the processed communication quality metric for the tracked device. The system controller may be further configured to receive the tracking data from each of the plurality of lighting control devices. The system controller may further determine, based on processed communication quality metrics received from each of the plurality of lighting control devices, a location of the tracked device with respect to one or more of the lighting control devices. For example, the system controller may be configured to determine the location of the tracked device via trilateration.

The system controller (e.g., or another device, such as a network device or a remote computing device) may be further configured to identify three or more lighting control devices that are closest to the tracked device. The system controller may determine a distance between the tracked device and each of the three or more lighting control devices that are closest to the tracked device. The system controller may be further configured to retrieve x-y coordinates for each of the three or more lighting control devices that are closest to the tracked device. The system controller may calculate a gradient function for the tracked device. For example, the gradient function for the tracked device may be based on the retrieved x-y coordinates for each of the three or more lighting control devices. Using the gradient function, the system controller may determine an estimated location of the tracked device. The system controller may further adjust the estimated location for the tracked device until a sign associated with the gradient function for the tracked device changes. For example, the determined location of the tracked device may be the estimated location of the track device when the sign associated with the gradient function changes.

The load control system may further comprise a network device. The network device may receive the determined location of the tracked devices from the system controller. The network device may be configured to retrieve a floorplan for the load control system. For example, the floorplan may include coordinates for the plurality of load control devices of the load control system. The network device may, based on the locations for each of the one or more tracked devices, determine coordinates for each of the one or more tracked devices. The network device may display a representation of the floorplan for the load control system. For example, the representation may comprise indications of the determined coordinates for each of the one or more tracked devices.

The system controller may receive tracking data from the plurality of lighting control devices. For example, the tracking data may include a beacon identifier of a respective tracked device and a processed communication quality metric. The system controller may, based on the tracking data, identify one or more tracked devices for which tracking data has been received. The system controller may determine, based on the tracking data, a location for each of the one or more tracked devices for which tracking data has been received. For example, the determined location for each of the one or more tracked devices for which tracking data has been received may be relative to at least one of the plurality of lighting control devices.

The system controller may determine the location for each of the one or more tracked devices for which tracking data has been received over the period of time via trilateration. The system controller may identify, for each of the one or more tracked devices, three or more lighting control devices that are closest to a respective tracked device of the one or more tracked devices. The system controller may determine, for each of the one or more tracked devices, a distance between the respective tracked device and each of the three more lighting control devices that are closest to a respective tracked device. The system controller may retrieve x-y coordinates for each of the three or more lighting control devices that are closest to the respective tracked device. The system controller may calculate a gradient function based on the retrieved x-y coordinates for each of the three or more lighting control devices that are closest to the respective tracked device. For example, the system controller may use the gradient function for each of the one or more tracked devices to determine an estimated location for each of the one or more tracked devices. The system controller may adjust the estimated location for each of the one or more tracked devices until a sign associated with the gradient function changes.

DETAILED DESCRIPTION

Figure 1:
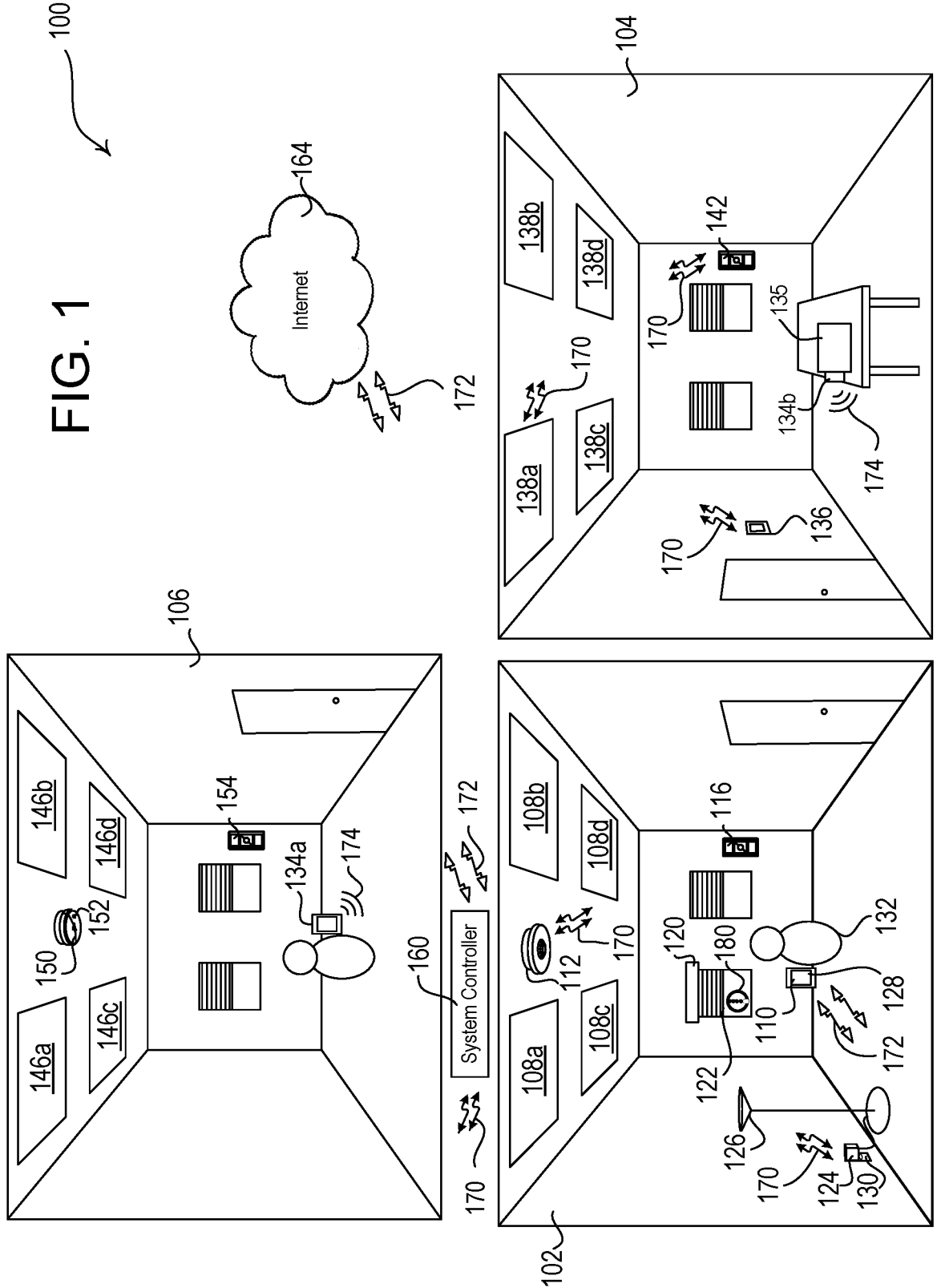
FIG. 1 is a diagram a depicting perspective view of an example environment for having lighting control devices.

FIG. 1 depicts a representative load control environment 100 (e.g., a load control area) comprising a load control system. The load control system may be commissioned for enabling control of electrical devices in the load control system. The commissioning of the load control system may include associating control devices, which may include control-source devices and/or control-target devices. As shown in FIG. 1, rooms 102, 104, and 106 in a building may be installed with one or more control-target devices, e.g., load control devices for controlling the electrical loads within a room or building. Each load control device may be capable of directly controlling the amount of power provided to an electrical load and may be controlled by a control-source device. Example control-target devices may include lighting fixtures 108a, 108b, 108c, 108d in room 102; lighting fixtures 138a, 138b, 138c, 138d in room 104; and lighting fixtures 146a, 146b, 146c, 146d in room 106. Each lighting fixture may include a lighting load (e.g., an LED light source) and a respective lighting control device for controlling the respective lighting load of the lighting fixture. For example, the lighting control device of each of the lighting fixtures may comprise a load regulation device (e.g., an LED driver, a ballast, a dimming module, or a switching module), a fixture controller that may interface with a separate load regulation device, and/or other lighting control device). Other example control-target devices may include a motorized window treatment 120 having a motor drive unit (e.g., including a motor) for controlling the position of covering material 122, a temperature control device (e.g., thermostat 136) for controlling an HVAC system, and/or an AC plug-in load control device 124 for controlling a plug-in electrical load, such as a floor lamp 126, a table lamp or another electrical device that is plugged in to the AC plug-in load control device 124. The AC plug-in load control device 120 may be plugged into an electrical receptacle 130.

Control devices (e.g., a control-source device and/or a control-target device) may communicate with each other and/or other devices via a wired and/or a wireless communication link. For example, the control devices may communicate on a first wireless communication link (e.g., a first wireless network communication link) via radio frequency (RF) signals 170. The RF signal 170 may be transmitted via any known RF communication protocol (e.g., a first wireless network communication protocol). For example, the first wireless network communication protocol may comprise a standard communication protocol (e.g., the BLUETOOTH, BLUETOOTH LOW ENERGY (BLE), WI-FI, THREAD, and/or ZIGBEE protocols) and/or a proprietary communication protocol, such as the CLEAR CONNECT protocol (e.g., the CLEAR CONNECT A and/or CLEAR CONNECT X protocols). A control device may be both a control-target and a control-source device. As described herein, the control devices of the load control environment 100 may use the RF signals 170 to communication with each other, for example, to enable control of the respective control devices in the load control environment 100.

A control-source device may be an input device that indirectly controls the amount of power provided to an electrical load by transmitting messages (e.g., digital messages) to the control-target device. The messages may include commands (e.g., control instructions, such as load control instructions) or another indication that causes the control-target device to determine commands for controlling an electrical load. Example control-source devices may include a remote control devices 116, 142, and 154, an occupancy sensor 112, a daylight sensor 150, a window sensor 180, and/or a network device 128. The control-source devices may include a wired or wireless device. The control-source devices may include a control device, such as a dimmer switch, an electronic switch, or the like. The first wireless network communication link may allow for communication of the commands (e.g., load control instructions) via the RF signals 170.

The load control system 100 may be commissioned to enable control of electrical loads based on commands communicated between control devices (e.g., control-source devices and control-target devices) configured to control the electrical loads. For example, control devices may be associated with one another and association information may be stored thereon, or at other devices, which may be used to communicate and identify digital commands at associated devices for controlling electrical devices in the system. The association information may include a device identifier (e.g., a unique device identifier) of one or more of the associated devices. The association information may be stored at the control devices, or at other devices that may be implemented to enable communication and/or identification of digital commands between the control devices.

The remote control devices 116, 142, and 154 may be wireless devices capable of controlling a control-target device via wireless communications. The remote control devices 116, 142, and 154 may be attached to the wall or detached from the wall. Examples of remote control devices are described in greater detail in U.S. Pat. No. 5,248,919, issued Sep. 28, 1993, entitled LIGHTING CONTROL DEVICE; U.S. Pat. No. 8,471,779, issued Jun. 25, 2013, entitled WIRELESS BATTERY POWERED REMOTE CONTROL WITH LABEL SERVING AS ANTENNA ELEMENT; and U.S. Patent Application Publication No. 2014/0132475, published May 15, 2014, entitled WIRELESS LOAD CONTROL DEVICE, the entire disclosures of which are hereby incorporated by reference.

The occupancy sensor 112 may be configured to detect occupancy and/or vacancy conditions in the load control environment 100 in which the load control system is installed. The occupancy sensor 112 may transmit messages to control-target devices via the RF signals 170 in response to detecting the occupancy or vacancy conditions. The occupancy sensor 112 may operate as a vacancy sensor, such that messages are transmitted in response to detecting a vacancy condition (e.g., messages may not be transmitted in response to detecting an occupancy condition). Examples of RF load control systems having occupancy and/or vacancy sensors are described in greater detail in U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 150 may be configured to measure a total light intensity in the visible area of the load control environment 100 in which the load control system is installed. The daylight sensor 150 may transmit messages including the measured light intensity via the RF signals 170 for controlling control-target devices in response to the measured light intensity. The daylight sensor 150 may enter an association mode and may transmit association messages via the RF signals 170 in response to actuation of a button 152 on the daylight sensor 150. Examples of RF load control systems having daylight sensors are described in greater detail in U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The window sensor 180 may be configured to measure an exterior light intensity coming from outside the load control environment 100 in which the load control system is installed. The window sensor 180 may be mounted on a façade of a building, such as the exterior or interior of a window, to measure the exterior natural light intensity depending upon the location of the sun in the sky. The window sensor 180 may detect when direct sunlight is directly shining into the window sensor 180, is reflected onto the window sensor 180, or is blocked by external means, such as clouds or a building, and may send messages indicating the measured light intensity. The window sensor 180 may transmit messages including the measured light intensity via the RF signals 170. The messages may be used to control an electrical load via one or more control-target devices. The window sensor 180 may enter an association mode and may transmit association messages via the RF signals 170 in response to actuation of a button on the window sensor 180.

The load control system of the load control environment 100 may include other types of control-source devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., power meters, energy meters, utility submeters, utility rate meters, etc.), central control transmitters, residential controllers, commercial controllers, industrial controllers, or any combination of control-source devices.

The load control system of the load control environment 100 may include a system controller 160 operable to transmit and/or receive messages via wired and/or wireless communications. For example, the system controller 160 may be configured to transmit and/or receive the RF signals 170 via the first wireless network communication link to communicate with one or more control devices (e.g., control-source devices and/or control-target devices). The system controller 160 may communicate messages between associated control devices, for example. The system controller 160 may be also coupled to one or more wired control devices (e.g., control-source devices and/or control-target devices) via a wired digital communication link. The system controller 160 may be on-site at the load control environment 100 or at a remote location. Though the system controller 160 is shown as a single device, the load control system of the load control environment 100 may include multiple system controllers and/or the functionality thereof may be distributed across multiple devices.

The system controller 160 may also be configured to communicate via a second wireless network communication link using RF signals 172. The RF signals 172 may be transmitted via any known RF communication protocol (e.g., WI-FI protocol or another Internet-protocol-based protocol, and/or a cellular-based communication protocol). For example, the second wireless network communication link may allow for high bandwidth communication. The system controller 160 may communicate over the Internet 164 and/or another network (e.g., a local area network) using the RF signals 172. The RF signals 172 may be transmitted using a different protocol and/or wireless band than the RF signals 170. In addition, the RF signals 172 may be transmitted using the same protocol and/or wireless band as the RF signals 170.

The system controller 160 may be configured to transmit and receive messages between control devices. For example, the system controller 160 may transmit messages to the control-target devices in response to the messages received from the control-source devices. The messages may include association information for being stored at the control devices or commands (e.g., control instructions) for controlling an electrical load. The commands may be used to control the electrical load of a control-target device or to control the electrical load according to control configuration information. The system controller 160 may receive commands from a control-source device and may perform a lookup of the control-target devices associated with the control-source device. The system controller 160 may send messages that include commands to the associated control-target devices for controlling electrical loads. The system controller 160 may store the association information from association messages communicated between control devices, or may query control devices for association information stored thereon.

Once a control-source device is associated with a control-target device, the control-source device may send messages to the control-target device to cause the control-target device to control an amount of power provided to an electric load. For example, the associated remote control device 116 may instruct the lighting control devices of the lighting fixtures 108a, 108b, 108c, 108d to increase or decrease the lighting level of the respective lighting loads, instruct the motorized window treatment 120 to raise or lower the covering material 122, instruct the AC plug-in load control device 124 to raise or lower the lighting level of the floor lamp 126, and/or instruct the temperature control device 136 to raise or lower the temperature in one or more rooms. The associated occupancy sensor 112 may send similar commands to a control-target device based on the detection of an occupancy or vacancy condition within the room 102. The daylight sensor 150 may send similar messages to a control-target device based on the detection of an amount of natural light within the room 106.

The lighting control devices in each of the lighting fixtures of the load control environment 100 (e.g., lighting fixtures 108a, 108b, 108c, 108d in room 102; lighting fixtures 138a, 138b, 138c, 138d in room 104; and lighting fixtures 146a, 146b, 146c, 146d in room 106) may be configured to communicate messages using the RF signals 170. In certain scenarios, the lighting control device in each of the lighting fixtures may be a load regulation device including the communication circuit that is configured to transmit and/or receive messages for controlling the lighting load of the lighting fixture via the RF signals 170. Also, or alternatively, the lighting control device in each of the lighting fixtures may be a fixture controller (e.g., a separate communication device) that may include the communication circuit that is configured to transmit and/or receive messages for controlling the lighting load of the lighting fixture via RF signals 170, and may be configured to control a load regulation device (e.g., a separate load regulation device) in the lighting fixture to control the lighting load. The lighting control devices in the lighting fixtures may communicate with and/or be responsive to commands (e.g., control instructions included in the messages transmitted using RF signals 170) received form an associated control-source device.

The system controller 160 may include control configuration information according to which one or more control-target devices may be controlled. For example, control configuration information may include preset configurations. The system controller 160 may generate messages according to the preset configurations to set a dimming level of the lighting fixtures to a predefined level, to set a level of the covering material 122 to a predefined level, to set a dimming level of the floor lamp 126 to a predefined level, or to set a temperature of the temperature control device 136 to a predefined level. Different presets may be configured to control different control-target devices to control a corresponding electrical load differently. Example preset configurations may include bedtime preset for when a user is going to bed, a movie watching preset for when the user is watching television or a movie, an away preset for when a user is away from the building, a home preset for when the user is in the building, or other preset configurations a user may define for an occasion.

The control configuration information may include zone configurations. The zone configurations may define one or more zones in which control-target devices are defined for being controlled. The zones may be a group of control devices for being associated that have a group identifier. The control-target devices in different zones may be separately controlled by sending messages having commands for controlling each zone. Different zones may be identified by a zone identifier (e.g., group identifier) that may be stored at the system controller 160 and/or the control devices in the zone. Each zone may be defined as a location having a zone identifier that is a location identifier. Though the zone may be described herein as a location having a location identifier, other zone configurations may be similarly implemented as described herein for locations.

The load control system of the load control environment 100 may include a network device, such as the mobile device 128. The mobile device 128 may perform wired and/or wireless communications. Examples of the mobile device 128 may comprise a mobile device, e.g., a wireless phone, a tablet, a laptop, a personal digital assistant (PDA), a wearable device (e.g., a watch, glasses, etc.), or another computing device. In addition, the mobile device 128 may comprise a personal computer (PC), a server, and/or another computing device connected to the Internet 164. The mobile device 128 may be a user device operated by a user 132. The mobile device 128 may communicate wirelessly by sending messages on the second wireless network communication link via the RF signals 172 (e.g., via the Internet and/or a local area network). The mobile device 128 may communicate by transmitting messages (e.g., in one or more Internet protocol packets) over the Internet 164 and/or another network (e.g., a local area network) using the RF signals 172. The mobile device 128 may communicate messages in response to a user actuation of one or more buttons on the mobile device 128. Examples of load control systems having control devices configured to transmit message via the Internet, such as smart phones and tablet devices, are described in greater detail in U.S. Patent Application Publication No. 2013/0030589, published Jan. 31, 2013, entitled LOAD CONTROL DEVICE HAVING INTERNET CONNECTIVITY; and U.S. Pat. No. 9,413,171, issued Aug. 9, 2016, entitled NETWORK ACCESS COORDINATION OF LOAD CONTROL DEVICES, the entire disclosures of which are incorporated herein by reference.

Although not shown in FIG. 1, the load control environment 100 may also include a network device, such as a remote computing device. For example, the remote computing device may access the remote control load control environment 100 via the Internet 164 and RF signals 172. For example, the system controller 160 may communication with remote computing device using the Internet 164 and RF signals 172.

The mobile device 128 may communicate with the system controller 160 using messages transmitted on the second wireless network communication link via RF signals 172 to allow the mobile device 128 to associate control devices (e.g., control-source devices and/or control-target devices) and/or control electrical loads. When the RF signals 170 and the RF signals 172 are communicated using the same communication protocol, the mobile device 128 may operate as the system controller 160, as described herein.

The mobile device 128 may execute a control/configuration application for displaying information received from the system controller 160 and/or receiving user input for communicating information to the system controller 160. For example, the control/configuration application may be executed locally at the mobile device 128. Also, or alternatively, the control/configuration application or portions thereof may be executed by a network device external to the load control environment 100 (e.g., connected to the Internet), and the mobile device 128 may access the control/configuration application using the RF signals 172. The mobile device 128 may comprise a visual display 110 for displaying information for the user 132 and may be configured to receive user inputs from the user 132. The system controller 160 may be accessed from the mobile device 128 via a web interface (e.g., a web browser) and/or via the control/configuration application (e.g., a load control application and/or configuration application) at the mobile device 128, for example. The user 132 may, using the control/configuration application, generate and store association information on the mobile device 128 for associating control-source devices and control-target devices.

The mobile device 128 may, using the control/configuration application, store configuration data for the load control environment 100 and/or the respective rooms 102, 104, 106. For example, using the mobile device 128, the user 132 may generate and/or store association information for associating control-source devices (e.g., the remote control devices 116, 142, 154) and control-target devices (e.g., the lighting fixtures 108*a-d*, 138*a-d*, 146*a-d*, and their respective lighting control devices). For example, the user 132 (e.g., via the mobile device 128) may use the control/configuration application to generate and/or store association information for associating control-source devices using the control/configuration application executed at the mobile device 128. The user 132 (e.g., via the mobile device 128) may also, or alternatively, use the control/configuration application for controlling the control devices in the load control environment 100.

The control/configuration application may be configured to display a graphical user interface (GUI) on the visual display 110 of the mobile device 128. The graphical user interface may include one or more representations (e.g., a floorplan) of the load control environment 100 and/or a respective room within the load control environment 100 (e.g., one or more of the rooms 102, 104, and 106). These representations may also indicate or illustrate the control devices (e.g., the lighting control devices of the lighting fixtures 108*a-d*, 138*a-d*, 146*a-d*) within the load control environment 100 and/or respective room. In addition, the user 132 (e.g., via the mobile device 128) may define area data associated with each of the control devices (e.g., a location of a respective control device within the load control environment 100). For example, each of the control devices in the load control system of the load control environment 100 may be assigned or associated with area data using the control/configuration application. For example, the area data for lighting fixtures 108*a-d* may indicate that they are located in room 102 and/or their respective positions (e.g., represented by x-y coordinates) within the room 102. Similarly, the area data for lighting fixtures 1038*a-d* may indicate that they are located in room 104, and the area data for lighting fixtures 1046*a-d* may indicate that they are located in room 106.

The association information may be stored in the form of a table or database that associates a unique device identifier (e.g., serial number) of a control-target device with a location and/or a unique device identifier (e.g., serial number) of one or more control-source devices. The association information may include a device type identifier that indicates a device type of the control-target device (e.g., lighting control device, motorized window treatment, plug-in load control device, temperature control device, etc.) and/or a device type of the control-source devices (e.g., remote control device, occupancy sensor, daylight sensor, window sensor, etc.). The association information may be sent from the mobile device 128 to the system controller 160. The system controller 160 may store the association information. The system controller 160 may identify the association information corresponding to each control-target device by identifying the device identifier of the control-target device and the corresponding associated devices (e.g., device identifiers of the control-source devices) to transmit the association information to each control-target device for storage thereon. The system controller 160 may identify other information, such as control configuration information, corresponding to each control-target device and may transmit the information to each control-target device for storage thereon, such that the control-target devices may respond according to the information.

The control devices may be associated with a location for enabling control of electrical loads in the location. The control devices may also be associated with other control devices in the location for enabling the control of the electrical loads. For example, a control device may be associated with a location by storing a location identifier at the control device, such that the control device may detect messages sent to control devices in the identified location. The control device (e.g., control-target device) may be associated with other control devices (e.g., control-source devices) by storing an identifier of the control devices, such that the control device (e.g., control-target device) may detect messages sent from associated control devices (e.g., control-source devices) for controlling an electrical load. When a control-target device is associated with a control-source device, the control-target device may be responsive to the control-source device.

The load control environment 100 may include one or more tracked devices, such as tracked devices 134a, 134b. A tracked device may include any device for which the location of the respective tracked device may be tracked through the load control environment 100. For example, the tracked device 134a may be a mobile device (e.g., a wireless phone, a tablet, a laptop, a personal digital assistant (PDA), and/or a wearable device) used by a user 133. In some embodiments, the mobile device 128 may be the tracked device 134a. The tracked device 134b may be a battery powered communication device (e.g., a tag), which may be attached to an object 135 (e.g., another device or item, such as a piece of inventory, merchandise, test equipment, etc.) that is to be tracked across the load control environment 100. Also, or alternatively, the tracked devices 134a, 134 may be another control device within the load control environment that can perform wireless communications, such as the remote control devices 116, 142, and 154, and/or the mobile device 128. As further described herein, each of the tracked devices 134a, 134b may be configured to transmit beacon messages via a short-range wireless communication link. For example, the tracked devices may transmit the beacon messages via RF signals 174. The RF signals 174 may be transmitted via any known RF communication protocol (e.g., a short-range wireless communication protocol, such as the BLUETOOTH LOW ENERGY (BLE) protocol). The beacon messages respectively transmitted by the tracked devices 134a, 134b may be used to determine the location of that tracked device in the load control environment 100. For example, the beacon messages transmitted by tracked device 134a may be used to determine that tracked device 134a is located in room 102. Similarly, the beacon messages transmitted by tracked device 134b may be used to determine that tracked device 134b is located in room 104. In addition, the remote control devices 116, 142, and 154, and/or the mobile device 128 may be configured to transmit the beacon message on the short-range wireless communication link via the RF signals 174.

The lighting control devices in the lighting fixtures 108a-d, 138a-d, and 146a-d may also be configured to communicate via the short-range wireless communication link. For example, the lighting control devices in the lighting fixtures 108a-d, 138a-d, 146a-d may use a short-range wireless communication link to periodically receive the beacon messages transmitted by the tracked devices 134a, 134b (e.g., via the RF signals 174). As further described herein, the lighting control devices in the lighting fixtures in the load control environment 100 may be configured to process the beacon messages received from a respective tracked devices to determine tracking data associated with that tracked device. As illustrated in FIG. 1, the load control environment 100 may include numerous lighting fixtures. Further, these lighting fixtures may be spread (e.g., densely distributed) across the load control environment 100. Accordingly, the beacon messages transmitted by the tracked device 134a, 134b may be received by many of the lighting control devices in these lighting fixtures as the tracked devices 134a, 134b moves throughout the load control environment 100, which may lead to the accumulation of a large amount of tracking data associated with the tracked device. The increased number of lighting control devices in the lighting fixtures in the load control environment 100 may increase the accuracy of the tracking data.

The lighting control devices in the lighting fixtures may also be configured to transmit the tracking data to the system controller 160 (e.g., or the mobile device 128 and/or other computing device, as described herein), which may further process the tracking data to identify a location of the tracked device 134a, 134b within the load control environment 100. For example, the lighting control devices in the lighting fixtures may transmit the tracking data to the system controller 160 via the RF signals 172. The lighting control devices in the lighting fixture may process the tracking data before transmitting processed tracking data to the system controller 160 to try to reduce the number of messages required to transmit the processed tracking data via the RF signals 172. The system controller 160 may process the tracking data to identify a location of the respective device. For example the system controller 160 may process the tracking data to identify an area location of a respective tracked device (e.g., a room, or an area within the room, in which the tracked device is located) or a fixture location of the respective tracked device (e.g., a lighting fixture(s) that is closest to the tracked device). Further, the location (e.g., area location and/or fixture location) of the respective tracked device may be displayed (e.g., displayed on the floorplan that represents the load control environment 100) on the mobile device 128 and/or another computing device.

Figure 2:
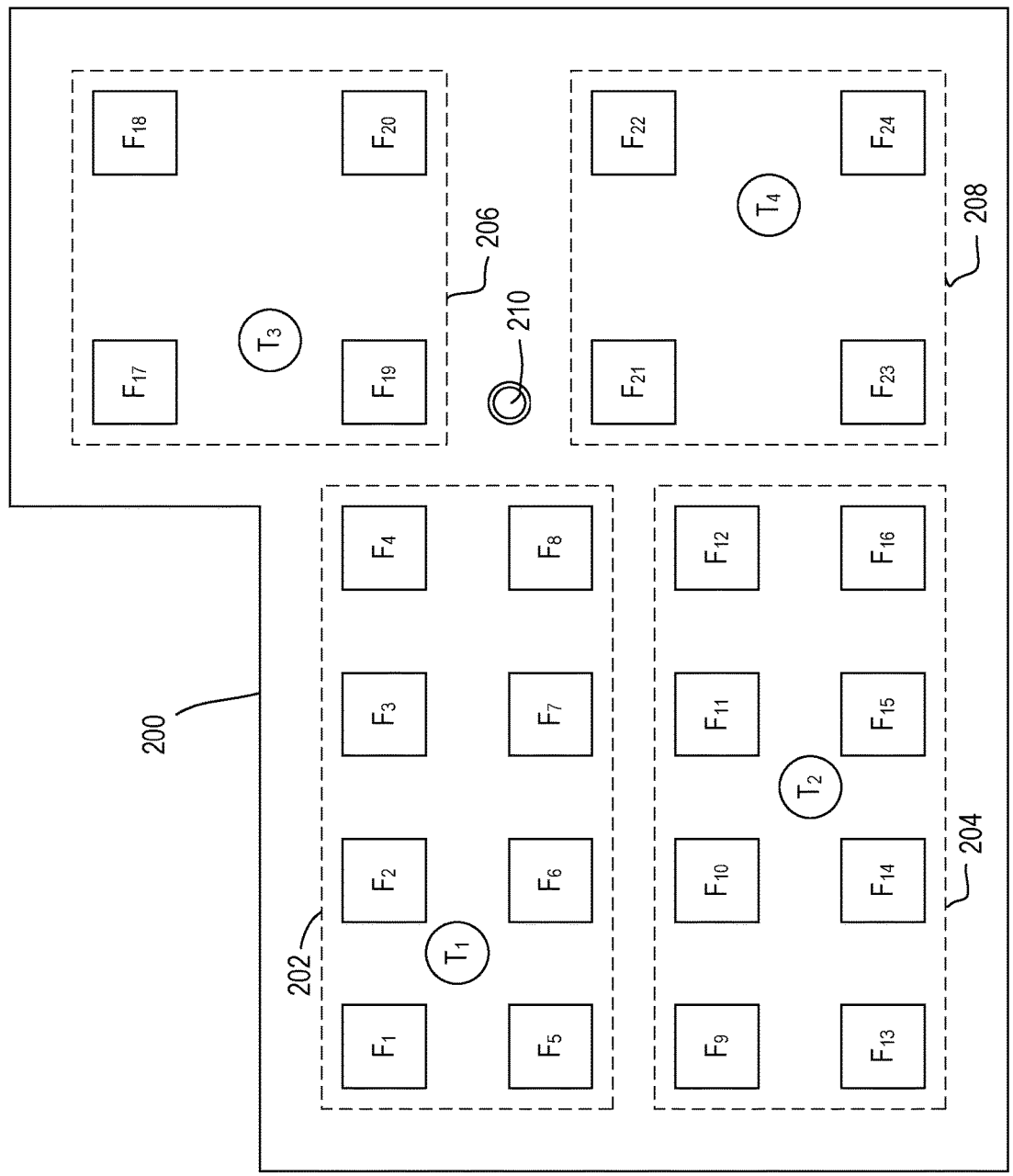
FIG. 2 is top view of an example space.

FIG. 2 is a top view of an example space 200 (e.g., a room) in a building (e.g., a load control environment) in which a load control system (e.g., the load control system of the load control environment 100 shown in FIG. 1) in installed. The space 200 may comprise a plurality of lighting fixtures $F_1$-$F_{24}$. As described herein, each of the lighting fixtures $F_1$-$F_{24}$ may comprise a lighting load (e.g., such as a light-emitting diode (LED) light source) and a lighting control device for controlling the respective lighting load to control an intensity level and/or a color (e.g., color temperature) of the light emitted by the respective lighting fixture. The space 200 may be divided up into multiple areas 202-208. Each of the areas may comprise one or more of the fixtures $F_1$-$F_{24}$. For example, the areas 202-208 may correspond to rooms within the load control system (e.g., the rooms 102, 104, 106 of the load control environment 100 shown in FIG. 1).

The lighting control device in each of the lighting fixtures $F_1$-$F_{24}$ may be configured to transmit and/or receive wireless signals (e.g., RF signals). The lighting control device in each of the lighting fixtures $F_1$-$F_{24}$ may be configured to communicate messages via the RF signals via a first wireless communication link (e.g., a wireless network communication link) using a first wireless communication protocol (e.g., a wireless network communication protocol, such as the CLEAR CONNECT or THREAD protocols). The lighting control device in each of the lighting fixtures $F_1$-$F_{24}$ may also be configured to communicate messages via the RF signals via a second wireless communication link (e.g., a short-range wireless communication link) using a second wireless communication protocol (e.g., a short-range wireless communication protocol, such as the BLUETOOTH LOW ENERGY (BLE) protocol). For example, the lighting control device in each of the lighting fixtures $F_1$-$F_{24}$ may be configured to receive messages including commands for controlling the respective lighting load via the wireless network communication link and/or receive messages including configuration information via the short-range wireless communication link. In addition, the lighting control device in each of the lighting fixtures $F_1$-$F_{24}$ may be configured to periodically transmit and/or receive beacon messages via the short-range wireless communication link.

The space 200 may also comprise a system controller 210 (e.g., the system controller 160 of the load control system of the load control environment 100 shown in FIG. 1). The system controller 210 may be configured to transmit messages including commands to the lighting control devices in the lighting fixtures $F_1$-$F_{24}$ via the short-range communication link. The system controller 210 may store area data including area identifiers (e.g., that indicate each area 202-208) along with device identifiers (e.g., unique device identifiers) of the lighting fixtures $F_1$-$F_{24}$ in each area. As described herein, the area data for each of the respective lighting fixtures $F_1$-$F_{24}$ may be configured and/or defined using a control/configuration application executed at a network device (e.g., the mobile device 128 of the load control environment 100 shown in FIG. 1). The system controller 210 may be configured to control the lighting fixtures $F_1$-$F_{24}$ in one of the areas 202-208 as a group.

The space 200 may also comprise one or more tracked devices $T_1$-$T_4$. Each of the tracked devices $T_1$-$T_4$ may be configured to transmit beacon messages via the short-range wireless communication link. The beacon messages transmitted by one of the tracked devices $T_1$-$T_4$ may be used to determine the location of the tracked device in the space 200 and/or the building in which the space is located. The beacon messages may each include a beacon identifier (e.g., a unique beacon identifier) of the tracked device $T_1$-$T_4$ that transmitted the beacon message. For example, the beacon messages may be transmitted using the BLE protocol. Each time that one of the tracked devices $T_1$-$T_4$ transmits a beacon message, the tracked device $T_1$-$T_4$ may transmit the beacon message on three different communication channels (e.g., at three different frequencies). For example, each of the tracked devices $T_1$-$T_4$ may comprise a mobile device, such as a smart phone or a tablet. In addition, each of the tracked devices $T_1$-$T_4$ may comprise a tag that may be configured to transmit beacon messages.

The lighting control devices in the lighting fixtures $F_1$-$F_{24}$ may be configured to receive the beacon messages transmitted by the tracked devices $T_1$-$T_4$ via the short-range wireless communication link. The lighting control device in each lighting fixture $F_1$-$F_{24}$ may be configured to receive the beacon message on each of the three different communication channels that the beacon message is transmitted on. The lighting control device in each lighting fixture $F_1$-$F_{24}$ may be configured to determine a communication quality metric of each of the received beacon message on each of the different communication channels. For example, the communication quality metric may comprise a received signal strength magnitude of the received beacon message on one of the communication channels, e.g., such as a received signal strength indicator (RSSI). The lighting control device in each lighting fixture $F_1$-$F_{24}$ may be configured to store the received signal strength magnitude of each of the beacon messages received on the different communication channels.

The lighting control device in each lighting fixture $F_1$-$F_{24}$ may be configured to transmit tracking data regarding the received beacon messages to the system controller 210. For example, the lighting control device may be configured to transmit the beacon identifier included in a received beacon messages as well as the communication quality metric (e.g., received signal strength magnitude) of the received beacon message to the system controller 210. However, a space, such as the space 200, may include numerous lighting fixtures (e.g., the lighting fixture $F_1$-$F_{24}$). If, for example, each lighting control device transmit tracking data in response to every beacon message that the lighting control device receives, the network over which the tracking data is transmitted (e.g., the first wireless network communication link via the RF signals 170) may be overloaded, which may cause the receip, of messages transited over that network to be delayed and/or fail. Message delays and/or failures may similarly increase as the number of tracked devices (e.g., and/or the number of beacon messages transmitted by each of the tracked devices) in a space increases.

Each of the lighting control devices may be configured to process (e.g., aggregate and/or filter) the tracking data prior to transmitting the tracking data to the system controller in order to minimize the number of transmissions on the wireless network communication link. For example, each lighting control device may be configured to process a subset of the received signal strength magnitudes of beacon messages received on a communication channel from a particular one of the tracked devices $T_1$-$T_4$ to determine a processed signal strength magnitude. Each lighting control device may be configured to determine the processed signal strength magnitude, for example, by determining a maximum value of the subset of the received signal strength magnitudes received from a particular one of the tracked devices $T_1$-$T_4$ over a period of time. In addition, the lighting control device may be configured to determine the processed signal strength magnitude by determining an average value of the subset of the received signal strength magnitudes received from a particular one of the tracked devices $T_1$-$T_4$ over a period of time. The lighting control device may be configured to transmit the processed signal strength magnitude if the processed signal strength has changed (e.g., changed by a threshold amount) since the processed signal strength magnitude was last transmitted for a particular tracked device $T_1$-$T_4$.

The system controller 210 may be configured to process the tracking data received from the lighting control devices in the lighting fixtures $F_1$-$F_{24}$ in the space 200 to determine the locations of one or more of the tracked devices $T_1$-$T_4$. The system controller 210 may be configured to use the area data regarding the areas 202-208 in which the various lighting fixtures $F_1$-$F_{24}$ are located to determine the locations of the tracked devices $T_1$-$T_4$ in the space 200. The system controller 210 may be configured to determine an area location of one of the tracked devices $T_1$-$T_4$, which may be an area in which the tracked device may be located. In addition, the system controller 210 may be configured to determine a fixture location relative to one of the tracked devices $T_1$-$T_4$. For example, the fixture location may indicate the one or more lighting fixtures that are nearest to a respective tracked device, which may allow the tracked device to be located.

Figure 3:
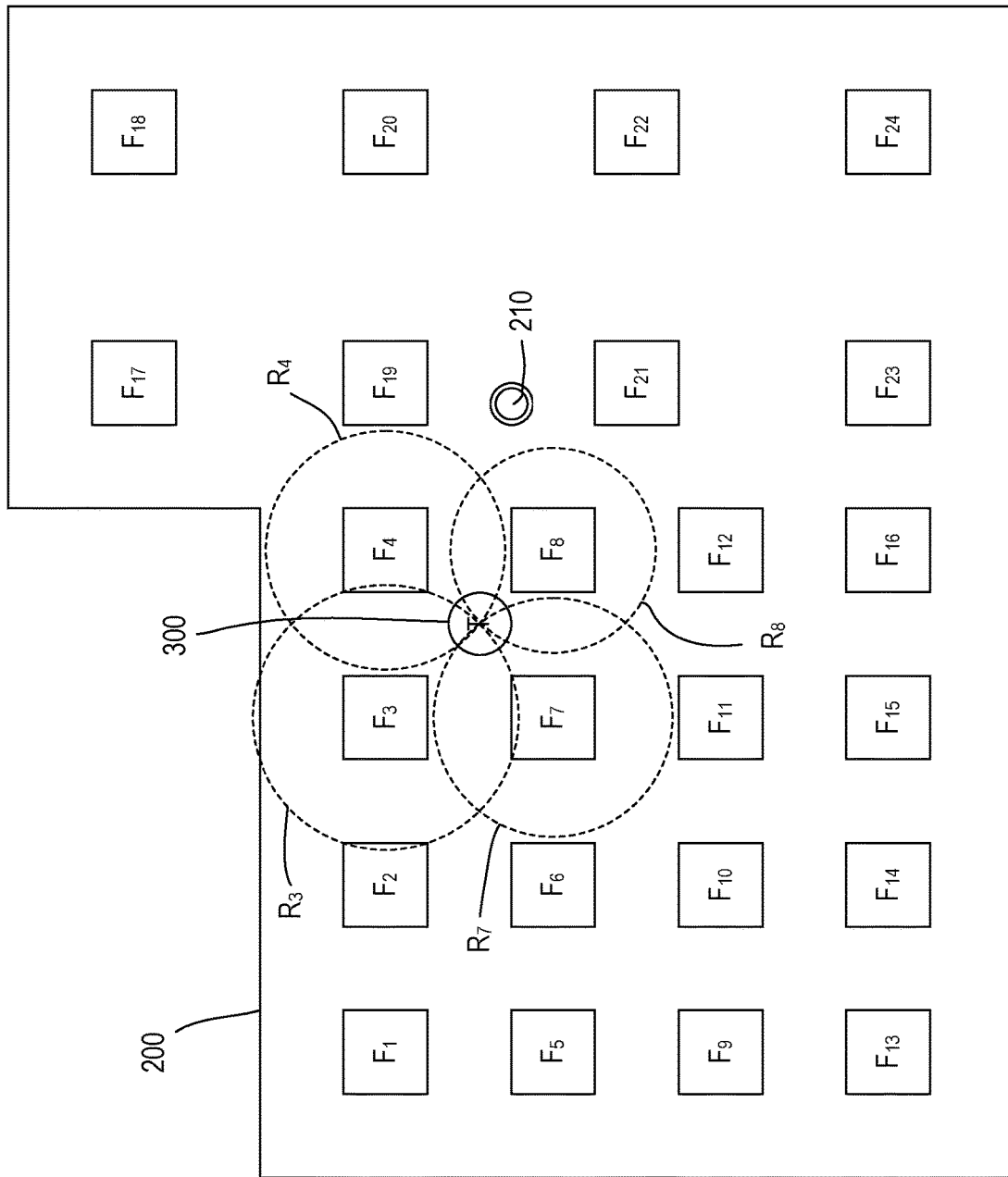
FIG. 3 is another top view of the example space.

In addition, the system controller 210 may be configured to determine the locations of one or more of the tracked devices $T_1$-$T_4$ using a trilateration technique. FIG. 3 is another top view of the example space 200 (e.g., a room) for illustrating the trilateration technique. Using the trilateration technique, the system controller 210 may be configured to calculate the distance from a tracked device 300 to each lighting fixture that received the beacon messages from the tracked device 300, for example, using the communication quality metric (e.g., received signal strength magnitude) included in the tracking data. The distance from each lighting fixture to the tracked device 300 may be determined based a range around each of the respective lighting fixture at which the tracked device may be located. As shown in FIG. 3, the lighting fixtures $F_3$, $F_4$, $F_7$, and $F_8$ may have respective ranges $R_3$, $R_4$, $R_7$, and $R_8$. While the ranges are shown as circles in FIG. 3, the ranges may actually be spheres, where the distance from each lighting fixture to the tracked device 300 may indicate a radius of the respective sphere around the lighting fixture. The tracked device 300 may be located along the circumference (e.g., the surface) of the respective sphere. The junction point of each of the spheres around the various lighting fixtures (e.g., the point at which each of the ranges $R_3$, $R_4$, $R_7$, and $R_8$ intersect) may indicate the location of the tracked device 300.

The system controller 210 may be configured to process the tracking data received from the lighting control devices (e.g., in at least three of the lighting fixtures) in order to determine the junction point of the spheres around the respective lighting fixtures and thus the location of the tracked device 300. For example, errors in the determination of the location of the tracked device 300 may be greatly reduced when the number of lighting control device for which the tracking data is processed to determine the location of the tracked device 300 is four or greater. Thus, the system controller may process the tracking data from lighting control devices in at least four lighting fixtures in order to determine the junction point of the spheres around the respective lighting fixtures and thus the location of the tracked device 300.

Figure 4:
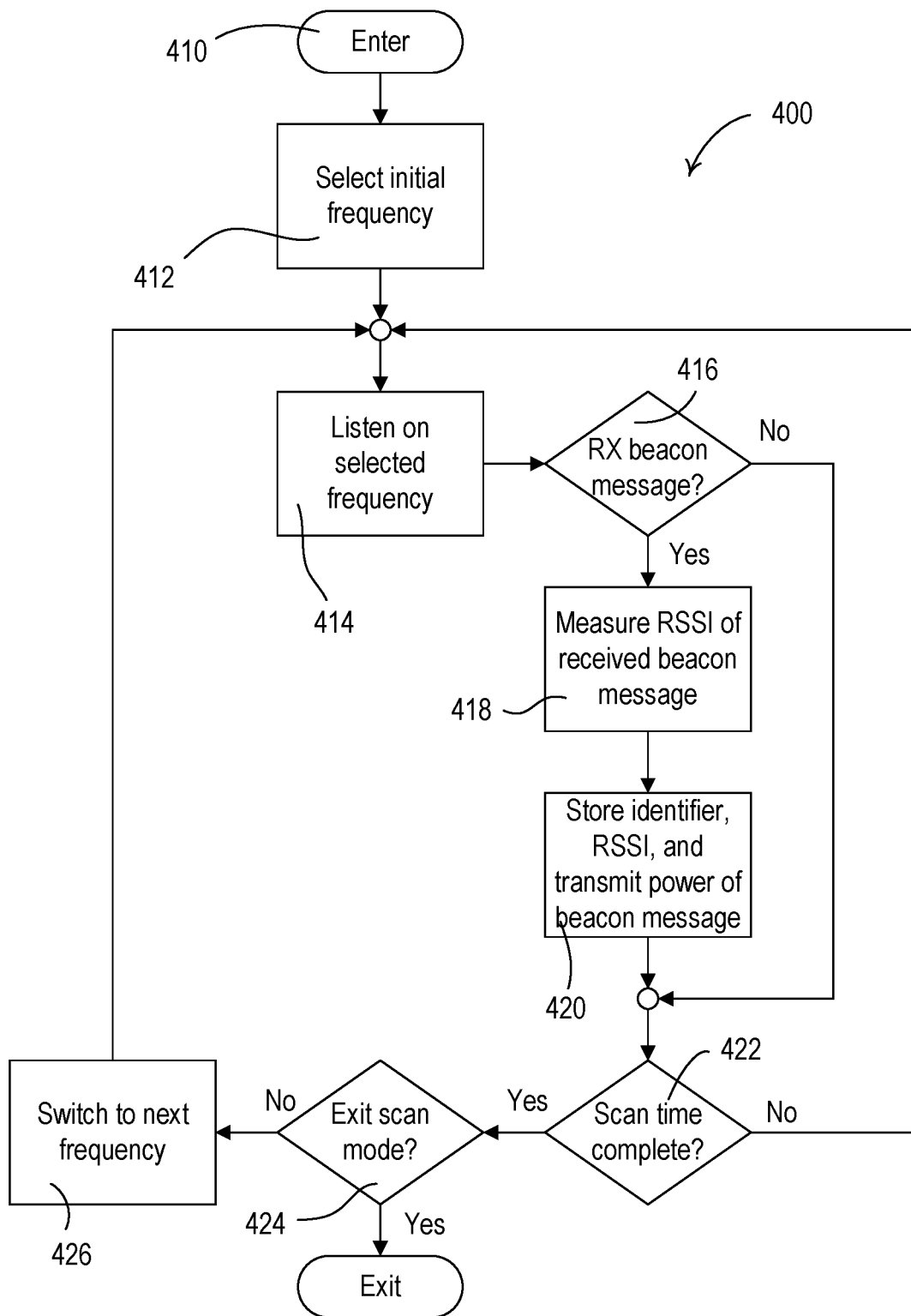
FIG. 4 is flowchart of an example procedure for receiving beacon messages from one or more tracked devices.

FIG. 4 is a simplified flowchart of an example procedure 400 for receiving beacon messages from one or more tracked devices (e.g., mobile devices and/or tags) in a space (e.g., the space 200 shown in FIG. 2 and/or the building in which the space is located). The procedure 400 may be executed by a lighting control device of a load control system (e.g., the lighting control devices located in the lighting fixtures 108*a-d*, 1038*a-d*, 146*a-d* shown in FIG. 1 and/or the lighting control devices located in the lighting fixtures $F_1$-$F_{24}$ shown in FIGS. 2 and 3). The lighting control device may be configured to receive the beacon messages on three different communication channels (e.g., three different frequencies). For example, the lighting control device may execute the procedure 400 periodically at 410.

At 412, the lighting control device may select (e.g., start on) an initial frequency (e.g., an initial communication channel) for receiving and/or processing beacon message. At 414, the lighting control device may listen on the selected frequency for a beacon message. If the lighting control device receives a beacon message at 416, the lighting control device may determine a communication quality metric (e.g., a received signal strength magnitude) of the received beacon message at 418. For example, the lighting control device may measure a received signal strength indicator of the received beacon message at 420. At 420, the lighting control device may store the received signal strength magnitude of the beacon message. In addition, the lighting control device may also store at 420 a transmit power $p_t$ of the beacon message, which may be included in the received beacon message.

The lighting control device may be configured to listen on the selected frequency for a scan time period (e.g., approximately 100 msec). If the scan time period is not complete at 422, the lighting control device may continue to listen on the selected frequency at 414. When the scan time period is complete at 422, the lighting control device may determine if the scan mode should be exited at 424. If not, the lighting control device may switch to the next frequency at 426 and listen on the newly selected frequency at 414. When the scan mode should be exited at 424, the lighting control device exits the procedure 400. For example, the lighting control device may listen on each frequency (e.g., each of the three frequencies on which a beacon message may be transmitted) before exiting the procedure 400. In addition, the lighting control device may continuously listen on each frequency and may only exit the procedure 400 upon receiving a command to exit the procedure 400.

Figure 5:
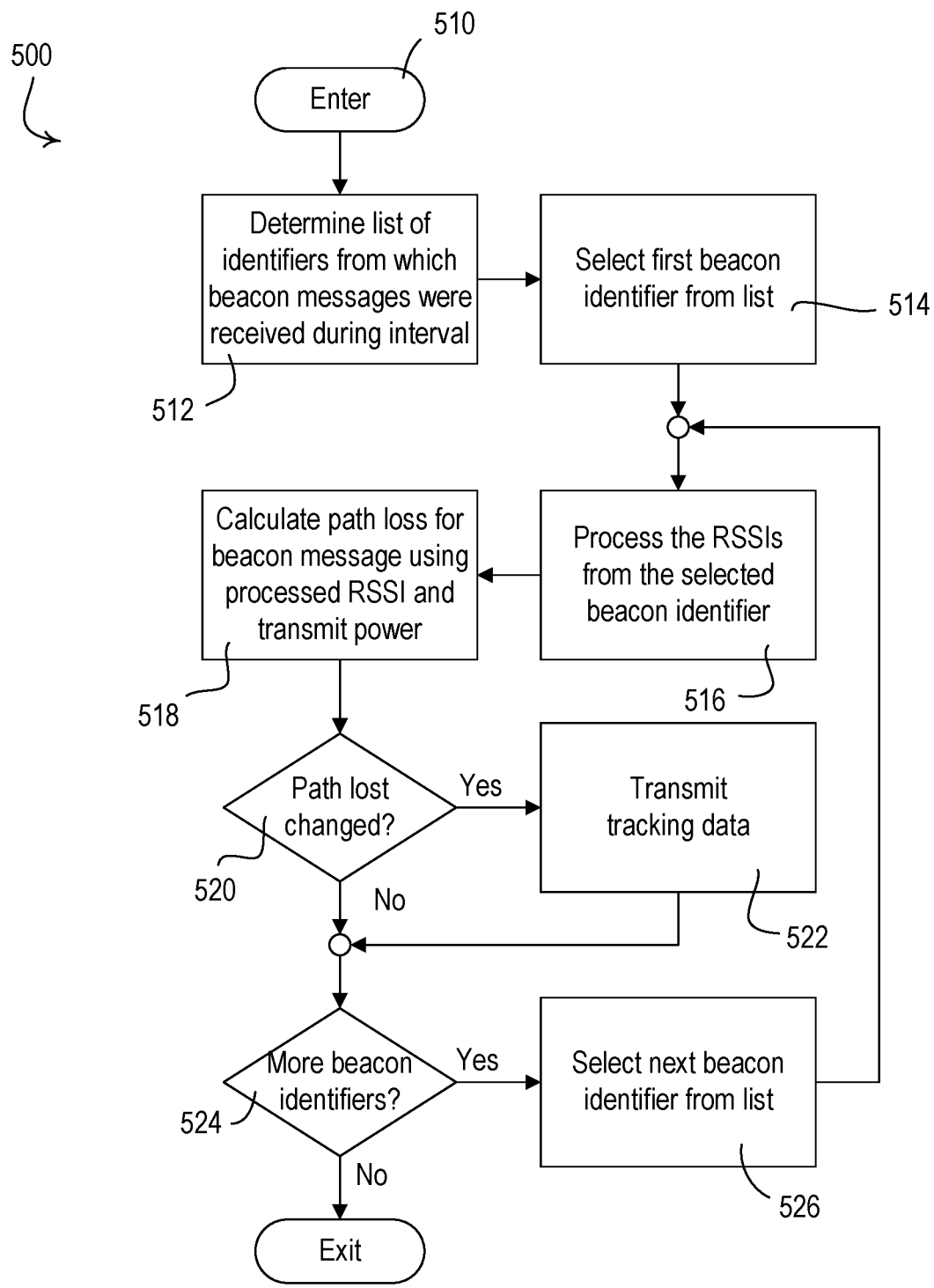
FIG. 5 is a flowchart of an example procedure for transmitting tracking regarding the location of one or more tracked devices in a space.

FIG. 5 is a simplified flowchart on an example procedure 500 for transmitting tracking regarding the location of one or more tracked devices (e.g., mobile devices and/or tags) in a space (e.g., the space 200 shown in FIG. 2 and/or the building in which the space is located). The procedure 500 may be executed by a lighting control device of a load control system (e.g., the lighting control devices located in the lighting fixtures 108*a-d*, 1038*a-d*, 146*a-d* shown in FIG. 1 and/or the lighting control devices located in the lighting fixtures $F_1$-$F_{24}$ shown in FIGS. 2 and 3). The lighting control device may be configured to transmit the tracking data to a system controller of the load control system (e.g., the system controller 160 shown in FIG. 1 and/or the system controller 210 shown in FIG. 2). For example, the lighting control device may execute the procedure 500 periodically at 510 (e.g., at a first interval, such as 1 sec).

At 512, the lighting control device may determine a list of beacon identifiers of the one or more tracked devices from which beacon messages were received during the first interval. At 514, the lighting control device may select a first beacon identifier from the list. At 516, the lighting control device may process the received signal strength indicators for a subset of beacon messages received from the tracked device having the selected beacon identifier over a second interval to determine a processed received signal strength indicator. The second interval may be longer than the first interval, e.g., such as 2 seconds. For example, the lighting control device may determine at 516 a maximum value (e.g., peak value) of the received signal strength indicators of the beacon messages received from the tracked device across all three frequencies (e.g., communication channels) on which the beacon messages were transmitted. In addition, the lighting control device may determine at 516 an average value of the received signal strength indicators of the beacon messages received from the tracked device across all three frequencies (e.g., communication channels).

At 518, the lighting control device may be configured to calculate a path loss e for the tracked device. For example, the path loss $\ell$ may be calculated by subtracting a transmit power value $p_t$ at which the beacon messages are transmitted by the tracked device on one of the communication channels from a receive power value of the beacon messages as received by the lighting control device. For example, the receive power value may be the processed received signal strength indicator $RSSI_p$ (e.g., as determined at 516). The transmit power value $p_t$ may indicate a power level at which the beacon message was transmitted by the tracked device. The lighting control device may receive the transmit power value in the received beacon message from the tracked device. In addition, the transmit power value $p_t$ for the tracked device may be stored in memory in the lighting control device, and may differ for different types of tracked devices. The lighting control device may calculate the path loss value e for the lighting control device by subtracting the transmit power value $p_t$ from the receive power value (e.g., the processed received signal strength indicator $RSSI_p$), e.g., $$\ell = RSSI_p - p_t.$$

The path loss $\ell$ may be an indicator of the distance between a respective lighting fixture and the tracked device.

The lighting control device may be configured to transmit (e.g., only transmit) tracking data to the system controller when needed (e.g., to reduce the number of transmissions on the wireless network communication link). For example, the lighting control device may only transmit the tracking data if the path loss value $\ell$ calculated at 518 has changed (e.g., as compared to a previously reported path loss value) at 520. As described herein, the load control system may include numerous lighting control devices. Accordingly, if the lighting control devices in the load control system only transmit tracking data for a respective tracked device when the path loss value e calculated has changed (e.g., as compared to a previously reported path loss value), the volume of tracking data being transmitted may decrease. The lighting control device may transmit tracking data, including the path loss value $\ell$, at 522. Alternatively or additionally, the lighting control device may determine if the processed received signal strength indicator $RSSI_p$ has changed at 520, and transmit tracking data including the processed received signal strength indicator $RSSI_p$ at 522. In addition, the lighting control device may include the transmit power value $p_t$ in the tracking data with the processed received signal strength indicator $RSSI_p$. If the processed received signal strength indicator $RSSI_p$ is included in the tracking data, step 518 may be omitted. If there are more beacon identifiers for which to transmit tracking data at 524, the lighting control device may select the next beacon identifier in the list at 526 and process the received signal strength indicators for the next beacon identifier at 516. If there are not more beacon identifiers for which to transmit tracking data at 524, the lighting control device may exit the procedure 500.

Figure 6:
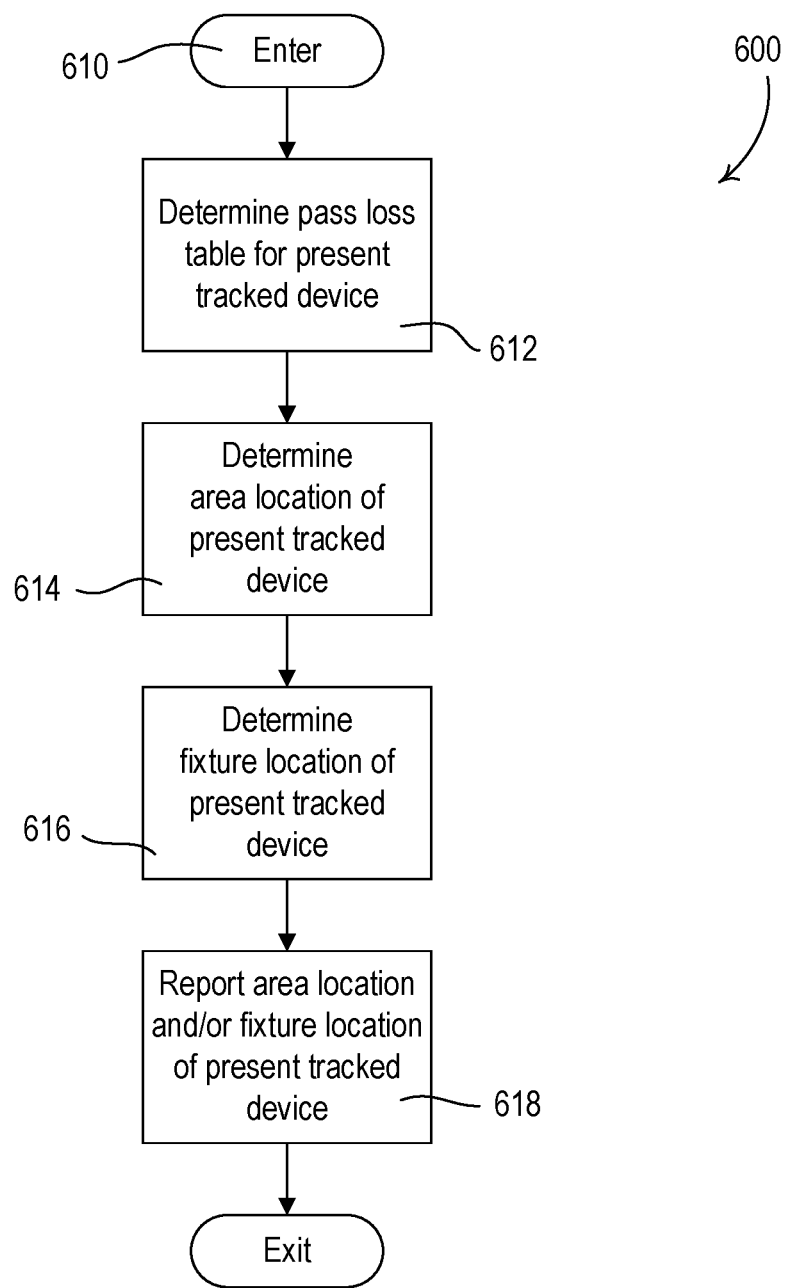
FIG. 6 is a flowchart of an example procedure for determining locations of one or more tracked devices in a space.

FIG. 6 is a simplified flowchart of an example procedure 600 for determining locations of one or more tracked devices (e.g., mobile devices and/or tags) in a space (e.g., the space 200 shown in FIG. 2 and/or the building in which the space is located). The procedure 600 may be executed by a system controller of a load control system (e.g., the system controller 160 shown in FIG. 1 and/or the system controller 210 shown in FIG. 2) or another device, such as a network device (e.g., the mobile device 128 shown in FIG. 1, or a remote computing device). The system controller may determine a location of one of the tracked devices, where the location may be an area location (e.g., an area in which the tracked device may be located) and/or a fixture location (e.g., one or more lighting fixtures near which the tracked device may be located). The system controller may be configured to receive tracking data from lighting control devices in one or more lighting fixtures (e.g., the lighting fixtures $F_1$-$F_{24}$ shown in FIG. 2) in the space. The system controller may be configured to execute the procedure 600 at 610 in response to getting updated tracking data for a particular tracked device (e.g., the tracking data received from a lighting control device at 522). The system controller may be configured to separately execute the procedure 600 for each of tracked devices that the system controller is tracking. The system controller may store in memory the beacon identifiers of the tracked devices that the system controller is tracking.

At 612, the system controller may be configured to determine a path loss table for the tracked device. The path loss table may include the path loss values for each of the lighting control devices from which the system controller received tracking data for the tracked device. The pass loss values for each lighting control device may be included in the received tracking data (e.g., as determined by the lighting control device at 518), and the system controller may simply include the path loss values in the path loss table at 612. In addition, the system controller may be configured to receive a received signal strength indicator $RSSI_p$ of a particular lighting control device (e.g., an $n^{th}$ lighting device) in the tracking data (e.g., the processed received signal strength indicator $RSSI_p$ as determined by the lighting control device at 516). The system controller may calculate a path loss $\ell_n$ for the lighting control device for by subtracting a transmit power value $p_n$ at which the beacon messages are transmitted by the tracked device from the received signal strength indicator $RSSI_n$ of the beacon messages as received by the lighting control device. The transmit power value $p_n$ may also be included in the tracking data. The system controller may receive the transmit power value $p_n$ in the tracking data from the lighting control device. In addition, the transmit power value $p_n$ for the tracked device may be stored in memory in the system controller, and may differ for different types of tracked devices. The system controller may determine the transmit power value $p_n$ and the received signal strength indicator $RSSI_n$ from the tracking data, and calculate the path loss value $\ell_n$ for the lighting control device by subtracting the transmit power value $p_n$ from the received signal strength indicator $RSSI_n$, e.g., $$\ell_n = RSSI_n - p_n.$$

The system controller may calculate the path loss value $\ell_n$ for each of the lighting devices from which the system controller received tracking data for the tracked device. The system controller may include all of the path loss values $\ell_n$ in the path loss table along with the device identifiers of the respective lighting control devices associated with that path loss values $\ell_n$.

At 614, the system controller may determine the area location (e.g., an area in which the tracked device may be located) using the path loss values in the path loss table. For example, the system controller may determine if the path loss value for one of the lighting control devices in the path loss table is much less than all of the other path loss values in the path loss table (e.g., separated by a threshold amount, such as 6 dB). If so, the system controller may determine that the tracked device is in the area in which the lighting fixture of that lighting control device is located. In addition, the system controller may determine an average value of the path loss values of the lighting control devices in each area, and determine that the tracked device is in the area that has the lowest average value of path loss values. The system controller may use the area data stored in memory to the determine the areas in which the lighting control devices are located.

At 616, the system controller may determine the fixture location (e.g., one or more lighting fixtures near which the tracked device may be located) using the path loss values in the path loss table. For example, the system controller may determine if the path loss value for one of the lighting control devices in the path loss table is much less than all of the other path loss values in the path loss table (e.g., separated by a threshold amount, such as 6 dB). If so, the system controller may determine that the tracked device is near the lighting fixture in which that lighting control device is installed. In addition, the system controller may determine a combined path loss value for each pair of lighting fixtures in each area in which there are lighting control device having path loss values in the path loss table, and determine that the tracked device is near the pair of lighting fixtures (e.g., between the lighting fixtures) that has the lowest value of combined path loss values. If only the area location is desired, step 616 may be omitted from the procedure 600.

At 618, the system controller may report location data regarding the tracked device, before the procedure 600 exits. For example, the system controller may report the most-commonly determined area location (e.g., as determined at 614 over a number of executions of the procedure 600) as well as the most-recently reported fixture location from that area of the most-commonly reported area location. In addition, the system controller may report a fixture location of the lighting fixture having the lighting control device with the minimum path loss value in the path loss table, e.g., from all of the areas in the space (e.g., which may be a different area than the most-commonly reported area location). The system controller may report (e.g., only report) the location data when the number of times that the most-commonly determined area location exceeds a threshold value.

Figure 7:
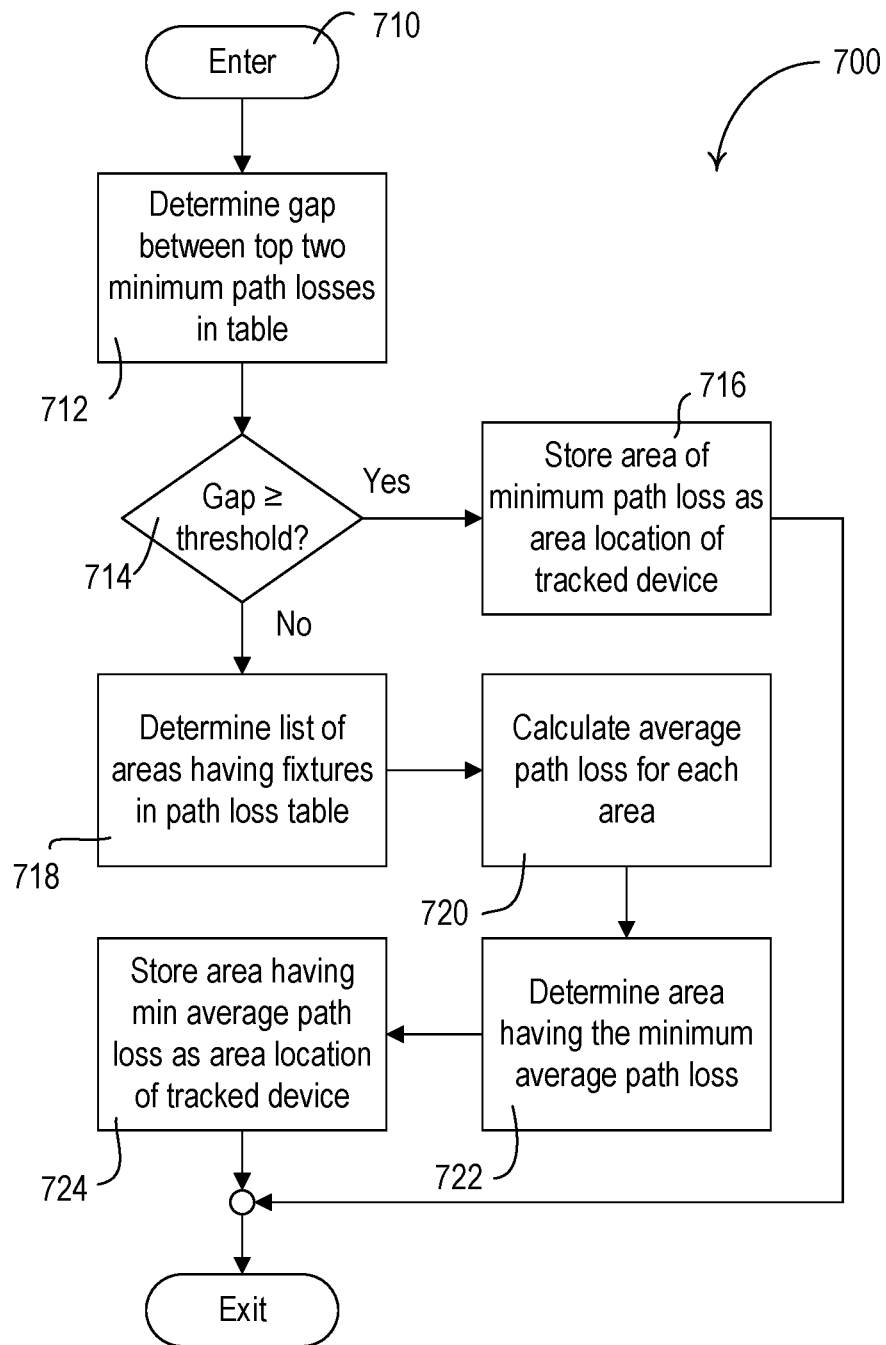
FIG. 7 is a flowchart of an example procedure for determining locations of one or more tracked devices in a space.

FIG. 7 is a simplified flowchart of an example procedure 700 for determining locations (e.g., area locations) of one or more tracked devices (e.g., mobile devices and/or tags) in a space (e.g., the space 200 shown in FIG. 2 and/or the building in which the space is located). The procedure 700 may be executed by a system controller of a load control system (e.g., the system controller 160 shown in FIG. 1 and/or the system controller 210 shown in FIG. 2) or another device, such as a network device (e.g., the mobile device 128 shown in FIG. 1, or a remote computing device). The system controller may determine an area location (e.g., an area in which the tracked device may be located) of the tracked device. The system controller may be configured to receive tracking data from lighting control devices in one or more lighting fixtures (e.g., the lighting fixtures $F_1$-$F_{24}$ shown in FIG. 2) in the space. The system controller may be configured to execute the procedure 700 at 710 in response to getting updated tracking data for a particular tracked device. For example, the system controller may execute the procedure 700 at 614 of the procedure 600 shown in FIG. 6. The system controller may be configured to separately execute the procedure 700 for each of tracked devices that the system controller is tracking. The system controller may store in memory the beacon identifiers of the tracked devices that the system controller is tracking.

At 712, the system controller may determine a gap (e.g., the difference) between the top two minimum path loss values in the path loss table (e.g., the path loss table determined at 612 of the procedure 600 shown in FIG. 6) for a particular tracked device. For example, the system controller may sort the path loss table by the pass loss value in a decreasing manner. The system controller may determine the gap by subtracting the second path loss value from first path loss value (e.g., the top path loss value in the table). If the gap is greater than or equal to a threshold value (e.g., approximately 6 dB) at 714, the system controller may store an area of the lighting fixture having the minimum path loss value in the path loss table as the area location of the tracked device at 716, before the procedure 700 exits. For example, the system controller may use the device identifier of the lighting device having the minimum path loss value in the path loss table to determine the area identifier based on area data stored in memory. Referring to FIG. 2, if the lighting control device of the lighting fixture $T_{19}$ has the minimum path loss value in the path loss table for the tracked device $T_3$, the system controller may store the area 206 as the area location of the tracked device $T_3$ at 716.

If the gap (e.g., as determined at 712) is not greater than or equal to the threshold value at 714, the system controller may build a list of areas that have lighting control devices with associated path loss values in the path loss table at 718. For example, if the path loss table includes path loss values for the lighting control devices in the lighting fixtures $F_3$, $F_4$, $F_7$, $F_8$, $F_{11}$, $F_{12}$, and $F_{21}$, the system controller may build a list of areas (e.g., areas 202, 204, and 208 of FIG. 2) at 718. At 718, the system controller may calculate an average value $\ell_{avg}$ for the path loss values in each of the areas in the list of areas. For example, for the area 202, the system controller may calculate the average value $\ell_{avg}$ of the path loss values for the lighting control devices in the lighting fixtures $F_3$, $F_4$, $F_7$, and $F_8$ (e.g., $\ell_{avg}=[\ell_3+\ell_4+\ell_7+\ell_8]/4$). At 722, the system controller may determine the area from the list of areas that has the minimum average value for the path loss values of the lighting control devices in that area. At 724, the system controller may store the area that has the minimum average value for the path loss values (e.g., as determined at 722) as the area location of the tracked device, and may exit the procedure 700.

Figure 8:
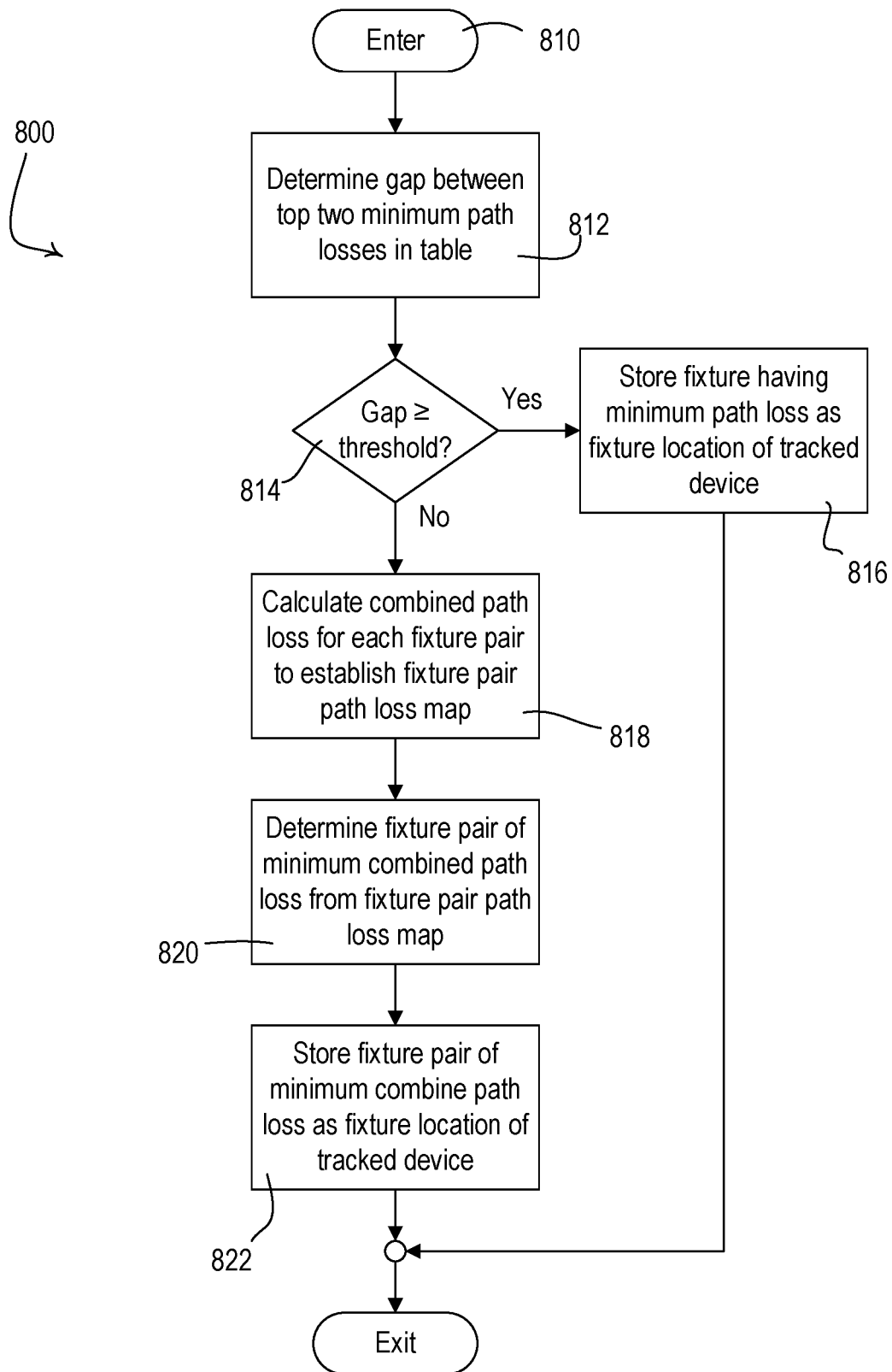
FIG. 8 is a flowchart of another example procedure for determining locations of one or more tracked devices in a space.

FIG. 8 is a simplified flowchart of an example procedure 800 for determining locations (e.g., fixtures locations) of one or more tracked devices (e.g., mobile devices and/or tags) in a space (e.g., the space 200 shown in FIG. 2 and/or the building in which the space is located). The procedure 800 may be executed by a system controller of a load control system (e.g., the system controller 160 shown in FIG. 1 and/or the system controller 210 shown in FIG. 2) or another device, such as a network device (e.g., the mobile device 128 shown in FIG. 1, or a remote computing device). The system controller may determine a fixture location (e.g., one or more lighting fixtures near which the tracked device may be located) of the tracked device. The system controller may be configured to receive tracking data from lighting control devices in one or more lighting fixtures (e.g., the lighting fixtures $F_1$-$F_{24}$ shown in FIG. 2) in the space. The system controller may be configured to execute the procedure 800 at 810 in response to getting updated tracking data for a particular tracked device. For example, the system controller may execute the procedure 800 at 616 of the procedure 600 shown in FIG. 6. The system controller may be configured to separately execute the procedure 800 for each of tracked devices that the system controller is tracking. The system controller may store in memory the beacon identifiers of the tracked devices that the system controller is tracking.

At 812, the system controller may determine a gap (e.g., the difference) between the top two minimum path loss values in the path loss table (e.g., the path loss table determined at 612 of the procedure 600 shown in FIG. 6) for a particular tracked device. For example, the system controller may sort the path loss table by the pass loss value in a decreasing manner. The system controller may determine the gap by subtracting the second path loss value from first path loss value (e.g., the top path loss value in the table). If the system controller is executing the procedure 800 immediately after executing the procedure 700 (e.g., as shown at 614 and 616 of the procedure 600 shown in FIG. 6), the system controller may use the gap determined at 712 of the procedure 700, and step 812 of the procedure 800 may be omitted. If the gap is greater than or equal to a threshold value (e.g., approximately 6 dB) at 814, the system controller may store the lighting fixture having the minimum path loss value in the path loss table as the fixture location of the tracked device at 816, before the procedure 800 exits. Referring to FIG. 2, if the lighting control device of the lighting fixture $T_{19}$ has the minimum path loss value in the path loss table for the tracked device $T_3$, the system controller may store the lighting fixture $T_{19}$ as the fixture location of the tracked device $T_3$ at 816.

If the gap (e.g., as determined at 812) is not greater than or equal to the threshold value at 814, the system controller may determine, at 818, a combined path loss value $L_{m,n}$ for each pair of lighting fixtures (e.g., a fixture pair {m, n}) in each area of the lighting control devices in the path loss table. Fixture pairs may be limited to adjacent lighting fixtures (e.g., side-by-side or diagonally adjacent, as shown in FIG. 2) and may not cross area boundaries. The system controller may be configured to determine lighting fixtures that are adjacent from the configuration data (e.g., floorplan data) of the load control system. For example, if the path loss table includes path loss values for the lighting control devices in the lighting fixtures $F_3$, $F_4$, $F_7$, and $F_8$ in the area 202, the fixture pairs in that area may be $\{F_3, F_4\}$, $\{F_3, F_7\}$, $\{F_3, F_8\}$, $\{F_4, F_7\}$, $\{F_4, F_8\}$, and $\{F_7, F_8\}$. The system controller may establish fixture pairs in each area in which there are lighting control devices having past loss values in the path loss table. If there are areas having a single lighting control device in the path loss table, the system controller may not establish a fixture pair for that area. The system controller may determine the combined path loss value $L_{m,n}$ for one of the fixture pairs at 818, for example, by calculating the combined path loss value $L_{m,n}$ using the fixture loss values $\ell_m$ and $\ell_n$ of the lighting control devices in each lighting fixtures, e.g., $$L_{m-n} = \text{cube root of } (\ell_m^3 + \ell_n^3).$$

In addition, the system controller may determine the combined path loss value $L_{m-n}$ for one of the fixture pairs by calculating an average value of the fixture loss values $\ell_m$ and $\ell_n$ of the lighting control devices in each lighting fixtures at 818. At 820, the system controller may determine the fixture pair (e.g., from all of the fixture pairs in the determined area) that has the minimum value for the combined path loss value $L_{m-n}$. At 822, the system controller may store the fixture pair that has the minimum value for the combined path loss value $L_{m-n}$ (e.g., as determined at 820) as the fixture location of the tracked device, and may exit the procedure 800.

Figure 9:
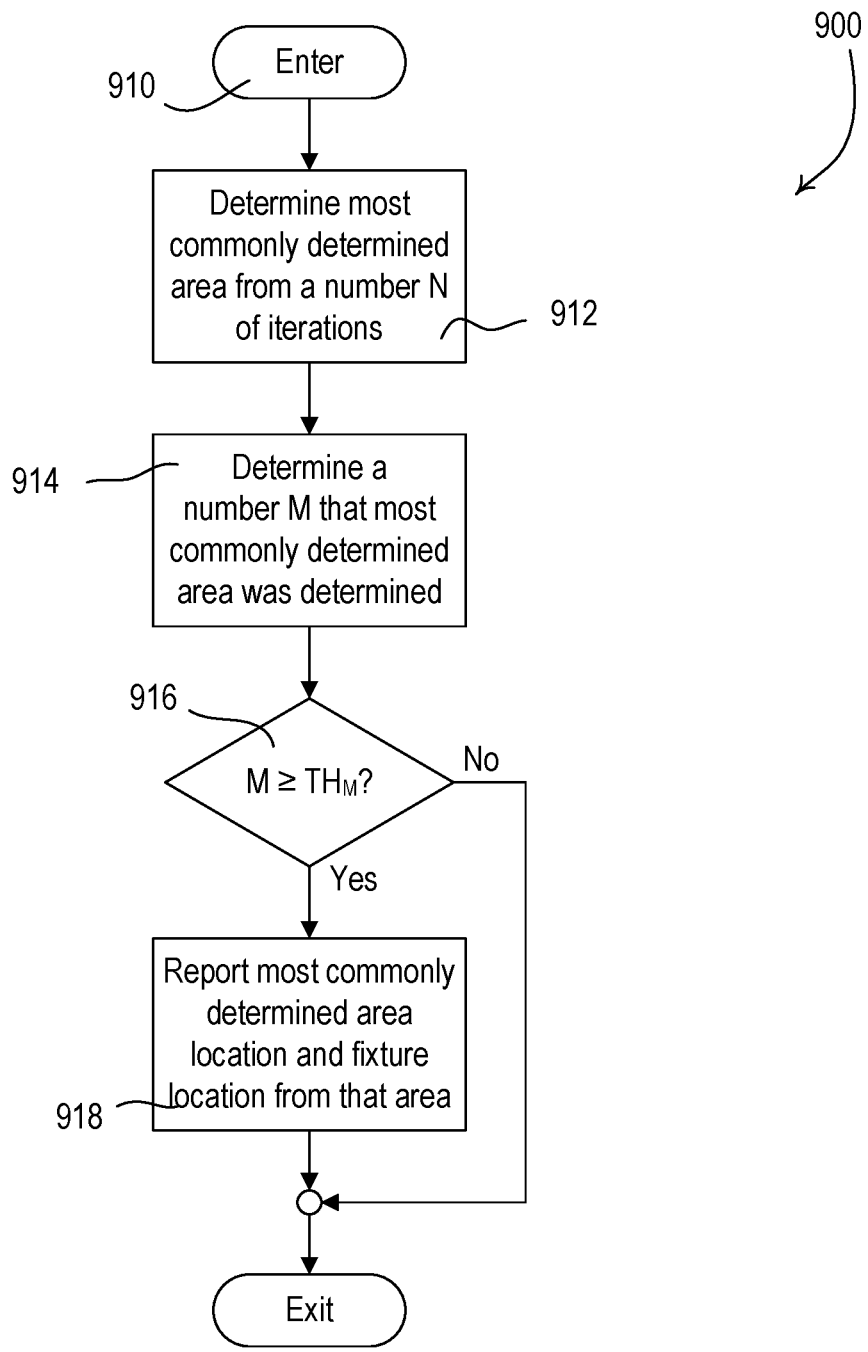
FIG. 9 is a flowchart of an example procedure for reporting locations of one or more tracked devices in a space.

FIG. 9 is a simplified flowchart of an example procedure 900 for reporting locations of one or more tracked devices (e.g., mobile devices and/or tags) in a space (e.g., the space 200 shown in FIG. 2 and/or the building in which the space is located). The procedure 900 may be executed by a system controller of a load control system (e.g., the system controller 160 shown in FIG. 1 and/or the system controller 210 shown in FIG. 2) or another device, such as a network device (e.g., the mobile device 128 shown in FIG. 1, or a remote computing device). The system controller may determine a location of one of the tracked devices, where the location may be an area location (e.g., an area in which the tracked device may be located) and/or a fixture location (e.g., one or more lighting fixtures near which the tracked device may be located). The system controller may be configured to execute the procedure 900 at 910 in response to getting updated tracking data for a particular tracked device. For example, the system controller may execute the procedure 900 at 618 of the procedure 600 shown in FIG. 6. The system controller may be configured to separately execute the procedure 900 for each of tracked devices that the system controller is tracking. The system controller may store in memory the beacon identifiers of the tracked devices that the system controller is tracking.

At 912, the system controller may determine a most-commonly determined area location from a number N (e.g., four) of consecutive iterations of the procedure 900 (e.g., a number N of consecutive iterations of 614 of the procedure 600 of FIG. 6). At 914, the system controller may determine a number M of times that the most-commonly determined area location (e.g., as determined at 912) was reported over the number N of the consecutive iterations of the procedure 900. At 916, the system controller may determine if the number M (e.g., as determined at 914) is greater than or equal to a threshold value $TH_M$. For example, the threshold value $TH_M$ may be equal to a percentage (e.g., 50%) of the number N of consecutive iterations of the procedure 900. If the number M is greater than or equal to the threshold value $TH_M$ at 916, the system controller may exit the procedure 900 without reporting any location data regarding the tracked device.

If the number M is greater than or equal to the threshold value $TH_M$ at 916, the system controller may report location data regarding the tracked device at 918, before the procedure 900 exits. For example, the system controller may report the most-commonly determined area location at 918. In addition, the system controller may report at 918 the most-recently reported fixture location from that area of the most-commonly determined area location (e.g., as determined at 916 of the procedure 900). Further, the system controller may report at 918 a fixture location of the lighting fixture having the lighting control device with the minimum path loss value in the path loss table, e.g., from all of the areas in the space (e.g., which may be a different area than the most-commonly determined area location determined at 912). The system controller may report the area locations and/or fixture locations by transmitting the location data in one or more messages to a network device, such as a mobile device and/or a computing device (e.g., a personal computer and/or server). Also or alternatively, the system controller may be configured to control one or more of the lighting control devices in the load control system to indicate the determined area locations and/or fixture locations. For example, the system controller may transmit messages to control the lighting control devices in the load control system such that the intensity of lighting loads near the determined area locations and/or fixture locations are increased (e.g., as compared to the lighting loads that are not near the determined area locations and/or fixture locations). Further, the intensity of lighting loads may increase as the distance between a respective lighting load and the determined area locations and/or fixture locations decreases.

Figure 10:
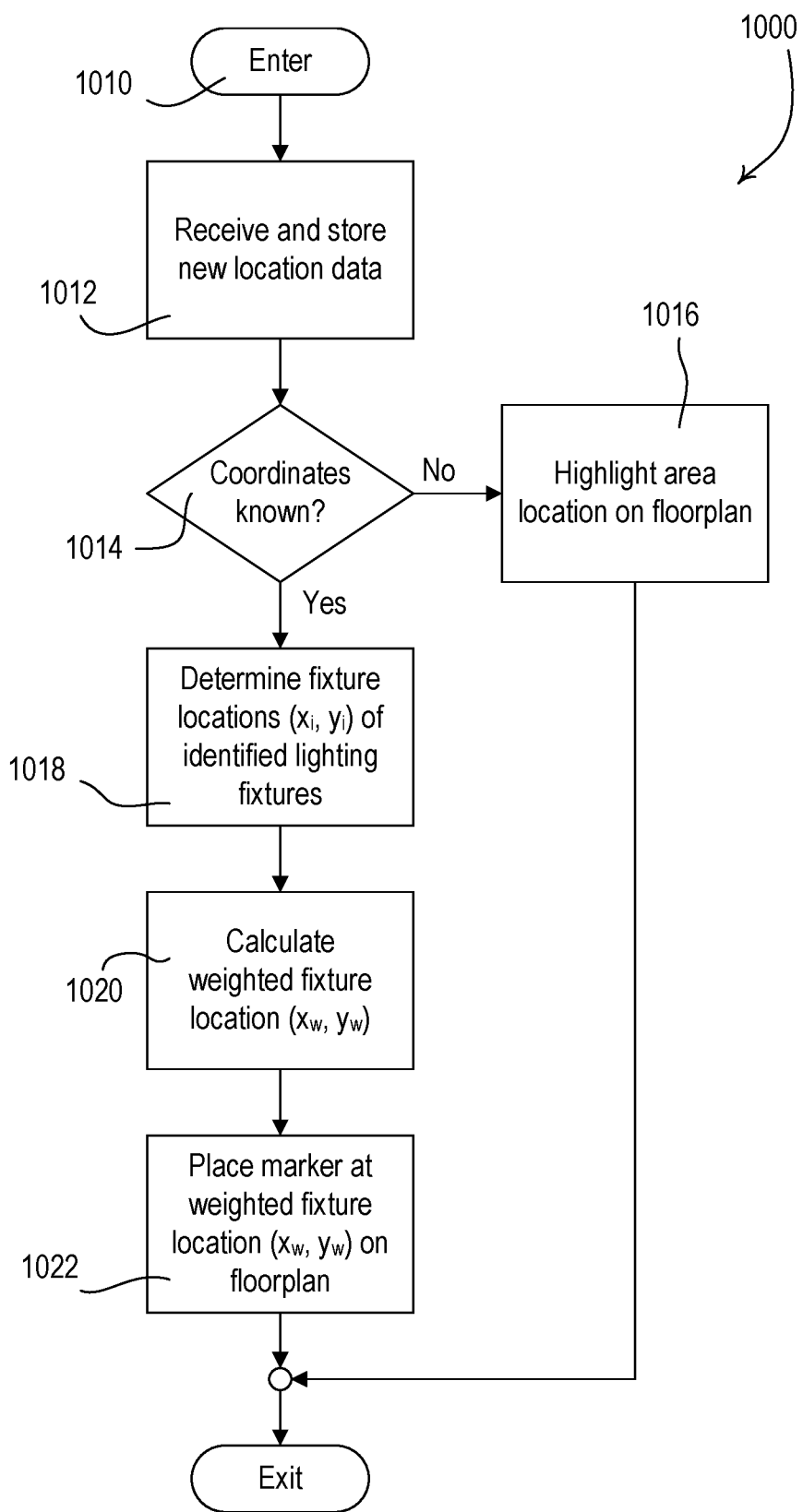
FIG. 10 is a flowchart of an example procedure for displaying locations of one or more tracked devices in a space.

FIG. 10 is a simplified flowchart of an example procedure 1000 for displaying locations of one or more tracked devices (e.g., mobile devices and/or tags) in a space (e.g., the space 200 shown in FIG. 2 and/or the building in which the space is located). The procedure 1000 may be executed by a network device (e.g., such as the mobile device 128 of the load control environment 100 shown in FIG. 1 or a remote computing device), which, as described herein, may be configured to execute a control/configuration application. The network device may receive location data that may indicate the location of the tracked devices from a system controller of a load control system (e.g., the system controller 160 shown in FIG. 1 and/or the system controller 210 shown in FIG. 2). The network device may be configured to store configuration data of the load control system and/or the space in which the load control system is installed, for example, using the control/configuration application. For example, the configuration data may comprise floorplan data including a floorplan image of the space. The network device may comprise a visible display (e.g., a screen) for displaying the floorplan image and/or a marker identifying the locations of the tracked devices. The network device may be configured to execute the procedure 1000 at 1010 in response to getting updated location data for a particular tracked device (e.g., in response to the location data transmitted by the system controller at 918 of the procedure 900 shown in FIG. 9). The network device may be configured to separately execute the procedure 1000 for each of tracked devices that the system controller is tracking. The network device may store in memory the beacon identifiers of the tracked devices that the system controller is tracking.

At 1012, the network device may receive and store new location data for a tracked device. At 1014, the network device may determine if coordinates (e.g., x-y coordinates) are available for the fixture locations included in the location data. For example, the configuration data (e.g., floorplan data) stored by the network device may include x-y coordinates for the various lighting fixtures along with the device identifiers of the lighting control devices installed in the respective lighting fixtures. The x-y coordinates of a lighting fixture may indicate a location on the floorplan image at which the lighting fixture may be located. The configuration data may also include the locations of the areas of the load control system on the floorplan image. If the coordinates of the fixture locations are not known at 1014, the network device may highlight the area associated with the area location of the tracked device (e.g., as included in the location data) at 1016, before the procedure 1000 exits.

If the coordinates of the fixture locations are known at 1014, the network device may determine the x-y coordinates of the fixture locations from the configuration data based on the device identifiers of the lighting control devices in the lighting fixtures at the fixture locations 1018. For example, if the fixture location is a single lighting fixture (e.g., as determined at 816 of procedure 800), the network device may determine a single set of x-y coordinates $(x_0, y_0)$ associated with the single lighting fixture using on the configuration data. If the fixture location is a fixture pair (e.g., as determined at 822 of the procedure 800 shown in FIG. 8), the network device may determine (e.g., retrieve) two sets of x-y coordinates $(x_1, y_1)$ and $(x_2, y_2)$ associated with the fixture pair from the configuration data. In addition, if the location data includes a fixture location of the lighting fixture having the lighting control device with the minimum path loss value in the path loss table, the network device may determine a single set of x-y coordinates $(x_{low}, y_{low})$ associated with that lighting fixture from the configuration data.

At 1020, the network device may determine a weighted fixture location $(x_w, y_w)$ from the x-y coordinates determined at 1018. For example, if the fixture location is a single lighting fixture, the network device may calculate the weighted fixture location $(x_w, y_w)$ using the set of x-y coordinates $(x_0, y_0)$ of the fixture location and the set of x-y coordinates $(x_{low}, y_{low})$ of the fixture location of the lighting fixture having the lighting control device with the minimum path loss value in the path loss table, e.g., $$x_w=[(4 \cdot x_0)+x_{low}]/5; \text{ and}$$

$$y_w=[(4 \cdot y_0)+y_{low}]/5.$$

In addition, if the fixture location is a fixture pair, the network device may calculate the weighted fixture location $(x_w, y_w)$ using the two sets of x-y coordinates $(x_1, y_1)$ and $(x_2, y_2)$ of the fixture location and the set of x-y coordinates $(x_{low}, y_{low})$ of the fixture location of the lighting fixture having the lighting control device with the minimum path loss value in the path loss table, e.g., $$x_w=[(2 \cdot x_1)+(2 \cdot x_2)+x_{low}]/5; \text{ and}$$

$$y_w=[(2 \cdot y_1)+(2 \cdot y_2)+y_{low}]/5.$$

At 1022, the network device may place a marker for the tracked device at the location of the weighted fixture location $(x_w, y_w)$ on the floorplan image, before the procedure 1000 exits.

Although FIG. 10 illustrates an example wherein the network device places a marker on a fixture location or highlights an area location, other examples of identifying the location of one or more tracked devices may be implemented. For example, a system controller may be configured to control one or more of the lighting control devices in the load control system to indicate the determined area locations and/or fixture locations. The system controller may transmit messages to control the lighting control devices in the load control system such that the intensity of lighting loads near the determined area locations and/or fixture locations are increased (e.g., as compared to the lighting loads that are not near the determined area locations and/or fixture locations). Further, the intensity of lighting loads may increase as the distance between a respective lighting load and the determined area locations and/or fixture locations decreases.

Figure 11:
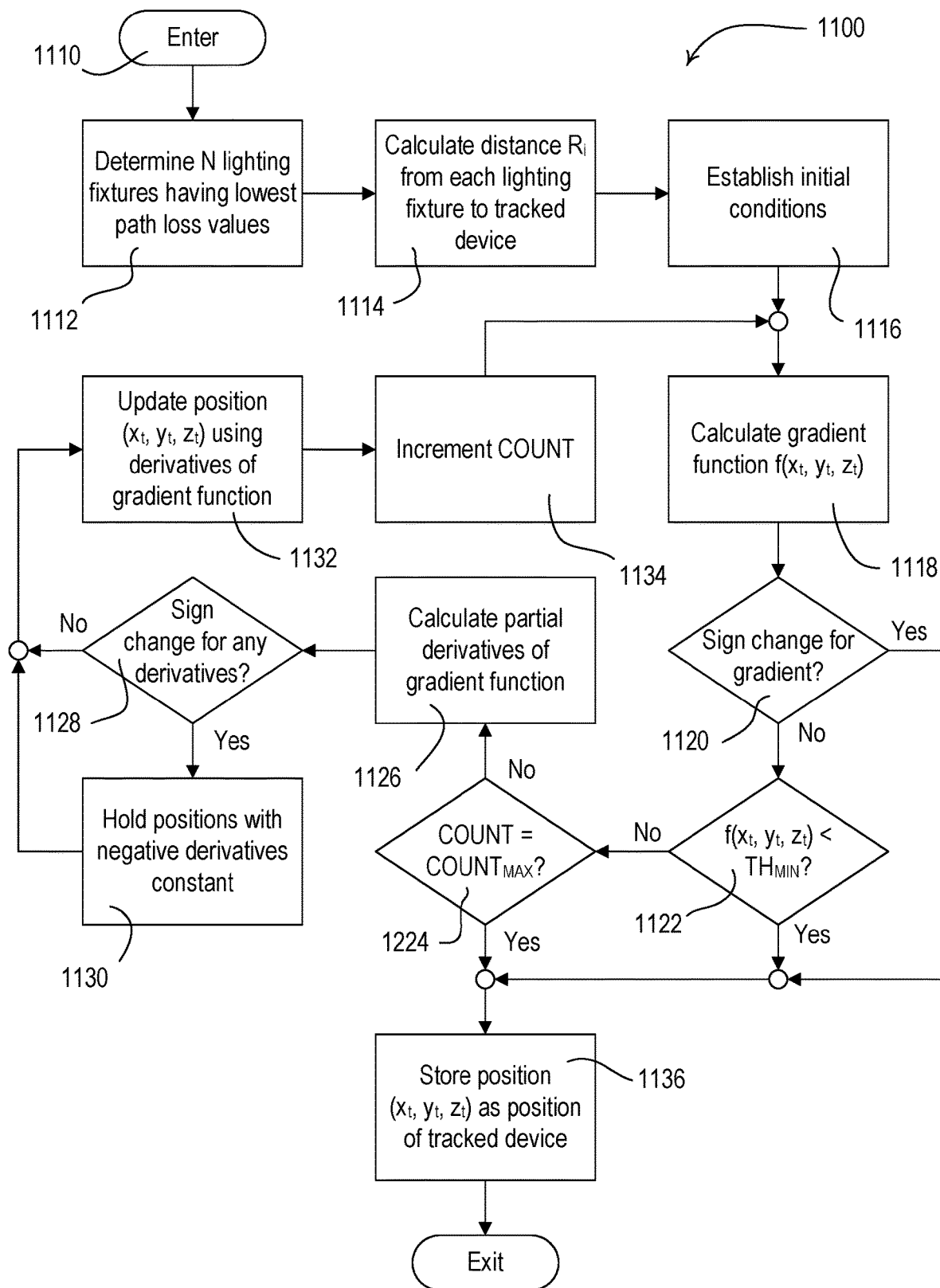
FIG. 11 is a flowchart of yet another example procedure for determining locations of one or more tracked devices in a space.

FIG. 11 is a simplified flowchart of an example procedure 1100 for determining locations of one or more tracked devices (e.g., mobile devices and/or tags) in a space (e.g., the space 200 shown in FIG. 3 and/or the building in which the space is located). The procedure 1100 may be executed by a computing device that is in communication with a load control system. For example, the computing device may be a system controller of the load control system (e.g., the system controller 160 shown in FIG. 1 and/or the system controller 210 shown in FIG. 3) and/or a network device (e.g., such as the mobile device 128 of the load control environment 100 shown in FIG. 1). The computing device may determine a location of a tracked device (e.g., the tracked device 300 shown in FIG. 3) using a trilateration technique. The computing device may be configured to receive tracking data from lighting control devices in one or more lighting fixtures (e.g., the lighting fixtures $F_1$-$F_{24}$ shown in FIG. 3) in the space. The computing device may be configured to execute the procedure 1100 at 1110 in response to getting updated tracking data for a particular tracked device. The computing device may be configured to separately execute the procedure 1100 for each of tracked devices that the computing device is tracking. The computing device may store in memory the beacon identifiers of the tracked devices that the computing device is tracking.

The computing device may process the tracking data from lighting control devices in a plurality of the lighting fixture (e.g., at least four lighting fixtures) in order to determine the location of the tracked device using the trilateration technique. At 1112, the computing device may determine a number N (e.g., four) of the lighting fixtures having the lighting control devices with the highest communication metrics (e.g., received signal strength magnitudes) of the beacon messages received from the tracked device and/or with the lowest path loss values in the tracking data. At 1114, the computing device may determine a distance $R_i$ from each of the number N of the lighting fixtures to the tracked device. For example, the computing device may calculate the distance $R_i$ for each of the number N of the lighting fixtures using a received signal strength magnitude $SS_i$ of the beacon messages received from the tracked device and a calibrated transmit power $SS_0$ at a known distance $R_0$ from the respective lighting fixture, e.g., $$R_i = R_0 \cdot 10^A, \text{ where } A=(SS_i-SS_0)/n,$$

and where n is a path loss exponent, which may be a constant that depends on the wireless transmission medium through which the beacon messages and typically ranges from 2 to 4. In some cases, constant values of the calibrated transmit power $SS_0$, the distance $R_0$, and/or the path loss exponent n may be used for all of the lighting fixtures.

At 1116, the computing device may establish initial conditions for the procedure 1100. For example, the computing device may establish load initial values in a location $(x_t, y_t, z_t)$ of the tracked device. For example, the computing device may set the initial values of the x-coordinate $x_t$ and the y-coordinate $y_t$ to be equal to the x-coordinate and y-coordinate of the location of the lighting fixture having the lighting control devices with the highest communication metric (e.g., highest received signal strength magnitude) of the beacon messages received from the tracked device and/or with the lowest path loss value in the tracking data. Since the lighting fixtures are typically installed on a ceiling and the tracked device (e.g., mobile device and/or tag) may be approximately six feet below the ceiling, the computing device may set the initial value of the z-coordinate $z_t$ to be approximately −6 feet. In addition, the computing device may initialize a counter COUNT to zero at 1116.

During the procedure 1100, the computing device may attempt to minimize the value of a function (e.g., a gradient function) $f(x_t, y_t, z_t)$. The computing device may repetitively calculate a value of the gradient function $f(x_t, y_t, z_t)$ and then adjust the values of the coordinates $x_t, y_t, z_t$ to try to move the value of the gradient function $f(x_t, y_t, z_t)$. The computing device may increment the counter COUNT each time that the computing device adjusts the values of the location $(x_t, y_t, z_t)$ of the tracked device. For example, the gradient function $f(x_t, y_t, z_t)$ may be based on the equation for a sphere, e.g., $$R_f = (x_t-x_f)^2+(y_t-y_f)^2+(z_t-z_f)^2,$$

where $(x_f, y_f, z_f)$ is the location of the lighting fixture around which the sphere is located. The computing device may be configured to attempt to find values for the location $(x_t, y_t, z_t)$ of the tracked device that get the radius $R_f$ in the above equation as close as possible to the values of the distances $R_i$ calculated at 1114. At 1118, the computing device may calculate the present value of the gradient function $f(x_t, y_t, z_t)$, e.g., $$f(x_t,y_t,z_t)=\Sigma[(x_t-x_i)^2+(y_t-y_i)^2+(z_t-z_i)^2-R_i], \text{ for } i=1 \text{ to } N.$$

For example, the first time that the computing device calculates the value of the gradient function $f(x_t, y_t, z_t)$, the computer device may use the initial values of the location $(x_t, y_t, z_t)$ of the tracked device determined at 1116.

Since the received signal strength magnitudes $SS_i$ used to calculate the distances Ri between the tracked device and the various lighting fixtures are affected by many non-idealities and variables in the environment of the area in which the load control system is installed, the computing device most likely may not be able to find values for the location $(x_t, y_t, z_t)$ of the tracked device that achieve a value of the gradient function $f(x_t, y_t, z_t)$ of zero. Therefore, the computing device uses one or more factors to determine when to end iterating on the location $(x_t, y_t, z_t)$ of the tracked device. The system controller may determine to stop adjusting the location $(x_t, y_t, z_t)$ of the tracked device when the calculated value of the gradient function $f(x_t, y_t, z_t)$ changes sign (e.g., from positive to negative, or vice versa) at 1120. The system controller may also determine to stop adjusting the location $(x_t, y_t, z_t)$ of the tracked device when the calculated value of the gradient function $f(x_t, y_t, z_t)$ is less than a minimum threshold value $TH_{MIN}$ at 1122. The system controller may also determine to stop adjusting the location $(x_t, y_t, z_t)$ of the tracked device when the value of the counter COUNT (e.g., the number of iterations of the calculation of the gradient function $f(x_t, y_t, z_t)$) is equal a maximum counter value $COUNT_{MAX}$ (e.g., 100 iterations) at 1124.

When the value of the gradient function $f(x_t, y_t, z_t)$ does not changes sign at 1120, the value of the gradient function $f(x_t, y_t, z_t)$ is not less than the minimum threshold value $TH_{MIN}$ at 1122, and the value of the counter COUNT does not equal the maximum counter value $COUNT_{MAX}$ at 1124, the computing device may adjust the location $(x_t, y_t, z_t)$ of the tracked device. For example, the computing device may calculate values for the partial derivatives of the gradient function $f(x_t, y_t, z_t)$, e.g., $\delta f(x_t, y_t, z_t)/\delta x_t$, $\delta f(x_t, y_t, z_t)/\delta y_t$, $\delta f(x_t, y_t, z_t)/\delta z_t$, at 1126. At 1128, the computing device may determine if any of the partial derivatives changed sign (e.g., from positive to negative, or vice versa) since the last iteration. If so, the computing device may determine to hold constant the values of the coordinates of the location $(x_t, y_t, z_t)$ of the tracked device for which the partial derivative changed sign (e.g., which may indicate that the respective coordinate of the position is as close as possible to a final value) at 1130. At 1132, the computing device may calculate new values for the coordinates of the location $(x_t, y_t, z_t)$ of the tracked device for those coordinates that were not determined to be held constant at 1130. For example, the computing device may calculate the new values for the coordinates of the location $(x_t, y_t, z_t)$ of the tracked device using the values of the partial derivatives computed at 1126, e.g., $$x_t=x_t-\lambda \cdot \delta f(x_t,y_t,z_t)/\delta x_t;$$

$$y_t=y_t-\lambda \delta f(x_t,y_t,z_t)/\delta y_t; \text{ and}$$

$$z_t=z_t-\lambda \cdot \delta f(x_t,y_t,z_t)/\delta z_t,$$

where $\lambda$ is a constant that is used to limit how much the coordinates of the location $(x_t, y_t, z_t)$ are changed during each iteration (e.g., to minimize overshoot) and may have a value much smaller than zero. In addition, since the lighting fixtures may be mounted on the ceiling, the value of the z-coordinate $z_t$ may be limited to be less than zero at 1132. The computing device may increment the counter COUNT at 1134, and then calculate the value of the gradient function $f(x_t, y_t, z_t)$ again at 1118 using the new values of the coordinates of the location $(x_t, y_t, z_t)$ (e.g., as determined at 1132).

When the value of the gradient function $f(x_t, y_t, z_t)$ has changed sign at 1120, the value of the gradient function $f(x_t, y_t, z_t)$ is less than the minimum threshold value $TH_{MIN}$ at 1122, or the value of the counter COUNT is equal to the maximum counter value $COUNT_{MAX}$ at 1124, the computing device may store the final values of the location $(x_t, y_t, z_t)$ as the location of the tracked device at 1136, before the procedure 1100 exits. The location $(x_t, y_t, z_t)$ may be used to locate a marker on a floorplan image of the space in which the load control system is installed (e.g., as at 1022 of the procedure 1000 shown in FIG. 10).

Figure 12:
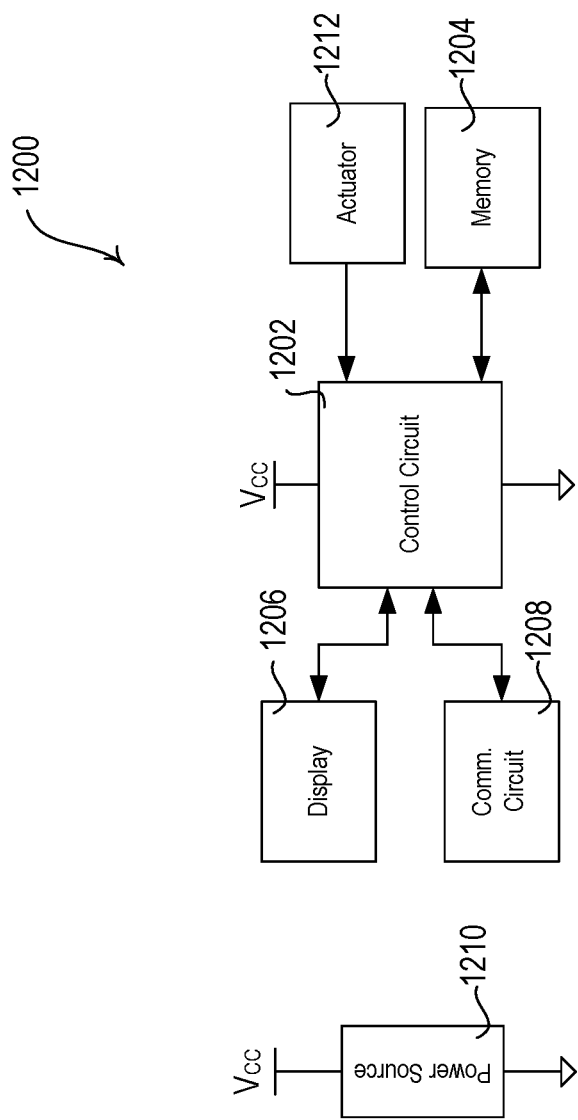
FIG. 12 is a block diagram illustrating an example network device.

FIG. 12 is a block diagram illustrating an example network device 1200 as described herein. The network device 1200 may include the mobile device 128 shown in FIG. 1, for example. The network device 1200 may include a control circuit 1202 for controlling the functionality of the network device 1200. The control circuit 1202 may include one or more general purpose processors, special purpose processors, conventional processors, digital signal processors (DSPs), microprocessors, integrated circuits, a programmable logic device (PLD), application specific integrated circuits (ASICs), or the like. The control circuit 1202 may perform signal coding, data processing, power control, input/output processing, or any other functionality that enables the network device 1200 to perform as described herein. The control circuit 1202 may store information in and/or retrieve information from the memory 1204. The memory 1204 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The network device 1200 may include a communications circuit 1208 for transmitting and/or receiving information. The communications circuit 1208 may perform wireless and/or wired communications. The communications circuit 1208 may include an RF transceiver or other circuit capable of performing wireless communications via an antenna. Communications circuit 1208 may be in communication with control circuit 1202 for transmitting and/or receiving information.

The control circuit 1202 may also be in communication with a display 1206 for providing information to a user. The processor 1202 and/or the display 1206 may generate GUIs for being displayed on the network device 1200. The display 1206 and the control circuit 1202 may be in two-way communication, as the display 1206 may include a touch screen module capable of receiving information from a user and providing such information to the control circuit 1202. The network device may also include an actuator 1212 (e.g., one or more buttons) that may be actuated by a user to communicate user selections to the control circuit 1202.

Each of the modules within the network device 1200 may be powered by a power source 1210. The power source 1210 may include an AC power supply or DC power supply, for example. The power source 1210 may generate a supply voltage $V_{CC}$ for powering the modules within the network device 1200.

Figure 13:
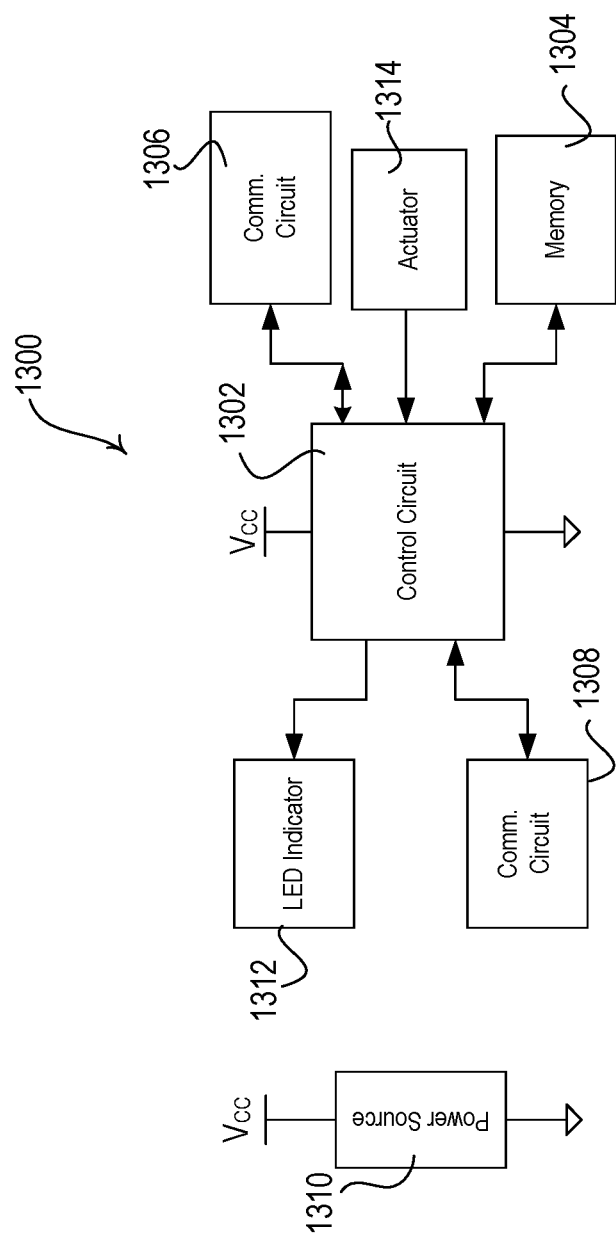
FIG. 13 is a block diagram illustrating an example system controller.

FIG. 13 is a block diagram illustrating an example system controller 1300 as described herein. The system controller 1300 may include a control circuit 1302 for controlling the functionality of the system controller 1300. The control circuit 1302 may include one or more general purpose processors, special purpose processors, conventional processors, digital signal processors (DSPs), microprocessors, integrated circuits, a programmable logic device (PLD), application specific integrated circuits (ASICs), or the like. The control circuit 1302 may perform signal coding, data processing, power control, input/output processing, or any other functionality that enables the system controller 1300 to perform as described herein. The control circuit 1302 may store information in and/or retrieve information from the memory 1304. The memory 1304 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory.

The system controller 1300 may include a communications circuit 1306 for transmitting and/or receiving information. The communications circuit 1306 may perform wireless and/or wired communications. The system controller 1300 may also, or alternatively, include a communications circuit 1308 for transmitting and/or receiving information. The communications circuit 1306 may perform wireless and/or wired communications. Communications circuits 1306 and 1308 may be in communication with control circuit 1302. The communications circuits 1306 and 1308 may include RF transceivers or other communications modules capable of performing wireless communications via an antenna. The communications circuit 1306 and communications circuit 1308 may be capable of performing communications via the same communication channels or different communication channels. For example, the communications circuit 1306 may be capable of communicating (e.g., with a network device, over a network, etc.) via a wireless communication channel (e.g., BLUETOOTH®, near field communication (NFC), WIFI®, WI-MAX®, cellular, etc.) and the communications circuit 1308 may be capable of communicating (e.g., with control devices and/or other devices in the load control system) via another wireless communication channel (e.g., WI-FI® or a proprietary communication channel, such as CLEAR CONNECT™).

The control circuit 1302 may be in communication with an LED indicator 1312 for providing indications to a user. The control circuit 1302 may be in communication with an actuator 1314 (e.g., one or more buttons) that may be actuated by a user to communicate user selections to the control circuit 1302. For example, the actuator 1314 may be actuated to put the control circuit 1302 in an association mode and/or communicate association messages from the system controller 1300.

Each of the modules within the system controller 1300 may be powered by a power source 1310. The power source 1310 may include an AC power supply or DC power supply, for example. The power source 1310 may generate a supply voltage $V_{CC}$ for powering the modules within the system controller 1300.

Figure 14:
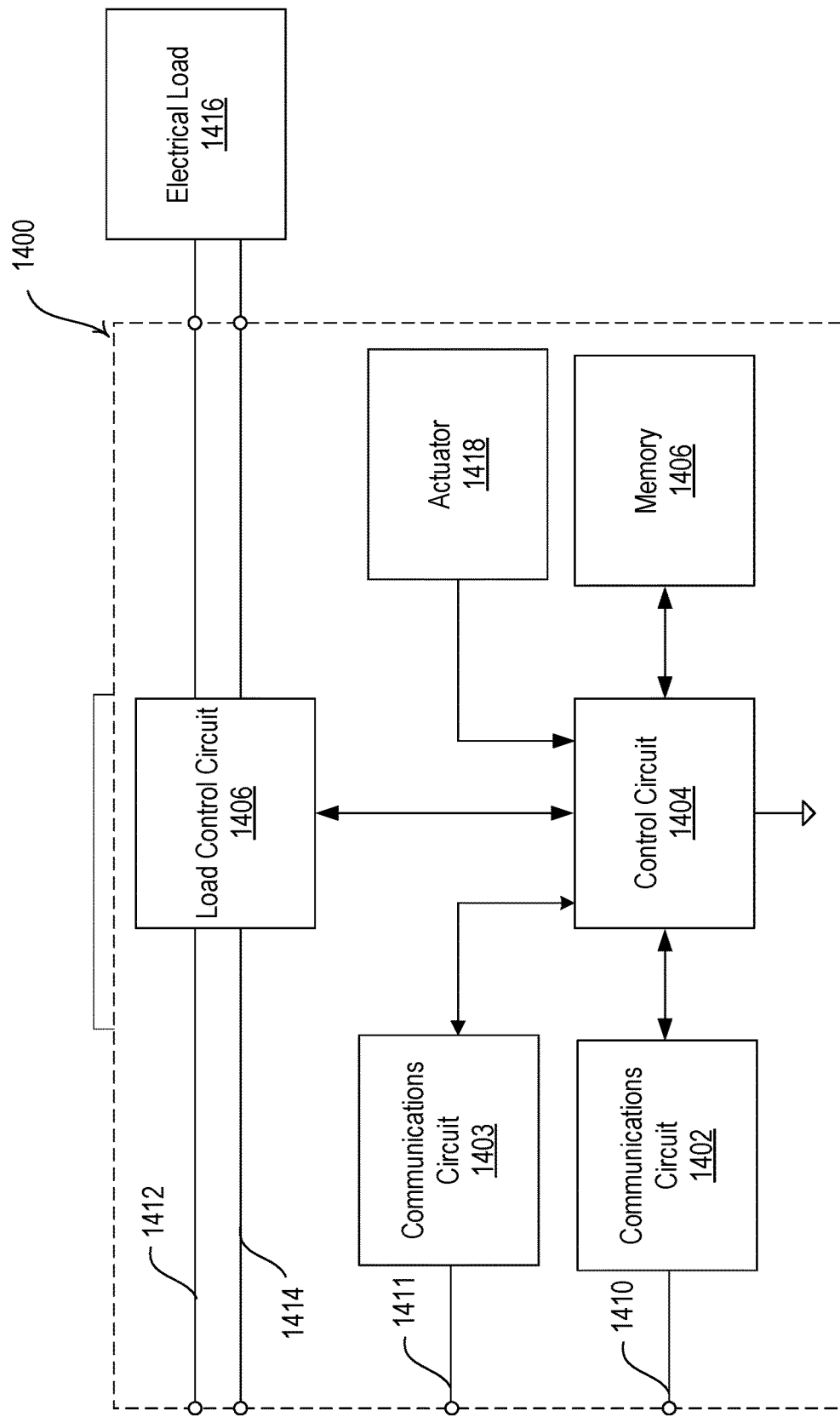
FIG. 14 is a block diagram illustrating an example control-target device.

FIG. 14 is a block diagram illustrating an example control-target device, e.g., a load control device 1400, as described herein. The load control device 1400 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 1400 may include a first communications circuit 1402 and a second communications circuit 1403. The first communications circuit 1402 may include a receiver, an RF transceiver, or other communications module capable of performing wired and/or wireless communications via a first communications link 1410. The second communications circuit 1403 may include a receiver, an RF transceiver, or other communications module capable of performing wired and/or wireless communications via a second communications link 1411. The first communications circuit 1402 and the second communication circuit 1403 may be in communication with control circuit 1404. The control circuit 1404 may include one or more general purpose processors, special purpose processors, conventional processors, digital signal processors (DSPs), microprocessors, integrated circuits, a programmable logic device (PLD), application specific integrated circuits (ASICs), or the like. The control circuit 1404 may perform signal coding, data processing, power control, input/output processing, or any other functionality that enables the load control device 1400 to perform as described herein.

The control circuit 1404 may store information in and/or retrieve information from the memory 1406. For example, the memory 1406 may maintain a registry of associated control devices and/or control configuration instructions. The memory 1406 may include a non-removable memory and/or a removable memory. The load control circuit 1408 may receive command from the control circuit 1404 and may control the electrical load 1414 based on the received commands. The load control circuit 1408 may send status feedback to the control circuit 1404 regarding the status of the electrical load 1416. The load control circuit 1408 may receive power via the hot connection 1412 and the neutral connection 1414 and may provide an amount of power to the electrical load 1416. The electrical load 1416 may include any type of electrical load.

The control circuit 1404 may be in communication with an actuator 1418 (e.g., one or more buttons) that may be actuated by a user to communicate user selections to the control circuit 1404. For example, the actuator 1418 may be actuated to put the control circuit 1404 in an association mode or discovery mode and may communicate association messages or discovery messages from the load control device 1400.

Figure 15:
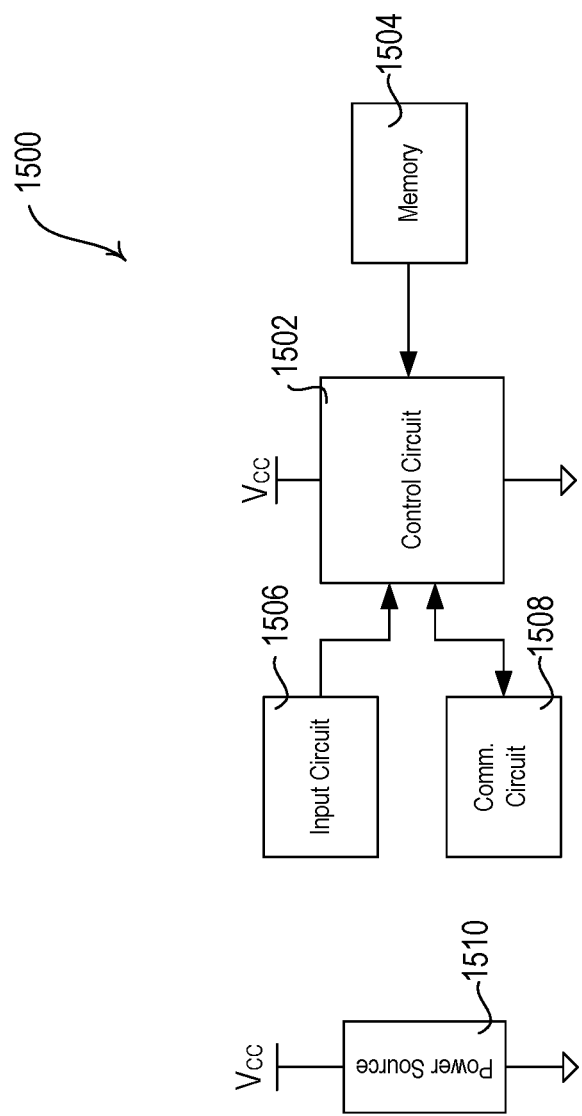
FIG. 15 is a block diagram illustrating an example control-source device.

FIG. 15 is a block diagram illustrating an example control-source device 1500 as described herein. The control-source device 1500 may be a remote control device, an occupancy sensor, a daylight sensor, a window sensor, a temperature sensor, and/or the like. The control-source device 1500 may include a control circuit 1502 for controlling the functionality of the control-source device 1500. The control circuit 1502 may include one or more general purpose processors, special purpose processors, conventional processors, digital signal processors (DSPs), microprocessors, integrated circuits, a programmable logic device (PLD), application specific integrated circuits (ASICs), or the like. The control circuit 1502 may perform signal coding, data processing, power control, input/output processing, or any other functionality that enables the control-source device 1500 to perform as described herein.

The control circuit 1502 may store information in and/or retrieve information from the memory 1504. The memory 1504 may include a non-removable memory and/or a removable memory, as described herein.

The control-source device 1500 may include a communications circuit 1508 for transmitting and/or receiving information. The communications circuit 1508 may transmit and/or receive information via wired and/or wireless communications. The communications circuit 1508 may include a transmitter, an RF transceiver, or other circuit capable of performing wired and/or wireless communications. The communications circuit 1508 may be in communication with control circuit 1502 for transmitting and/or receiving information.

The control circuit 1502 may also be in communication with an input circuit 1506. The input circuit 1506 may include an actuator (e.g., one or more buttons) or a sensor circuit (e.g., an occupancy sensor circuit, a daylight sensor circuit, or a temperature sensor circuit) for receiving input that may be sent to a device for controlling an electrical load. For example, the control-source device may receive input from the input circuit 1506 to put the control circuit 1502 in an association mode and/or communicate association messages from the control-source device. The control circuit 1502 may receive information from the input circuit 1506 (e.g. an indication that a button has been actuated or sensed information). Each of the modules within the control-source device 1500 may be powered by a power source 1510.

Figure 16:
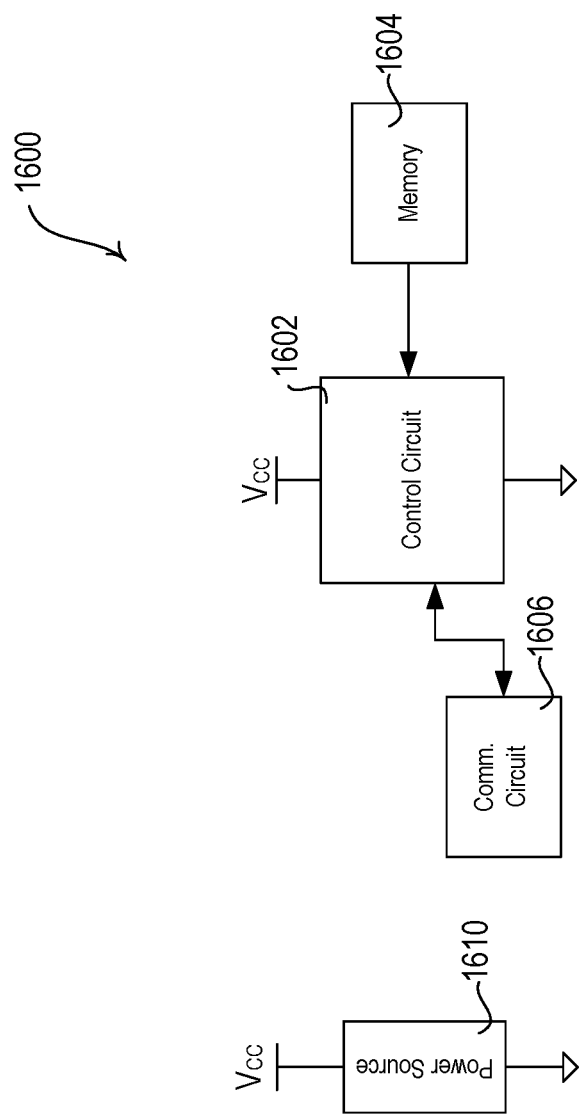
FIG. 16 is a block diagram illustrating an example tracked device.

FIG. 16 is a block diagram illustrating an example tracked device 1600 as described herein. The tracked device 1600 may be a battery powered communication device. The tracked device 1600 may include a control circuit 1602 for controlling the functionality of the tracked device 1600. The control circuit 1602 may include one or more general purpose processors, special purpose processors, conventional processors, digital signal processors (DSPs), microprocessors, integrated circuits, a programmable logic device (PLD), application specific integrated circuits (ASICs), or the like. The control circuit 1602 may perform signal coding, data processing, power control, input/output processing, or any other functionality that enables the tracked device 1600 to perform as described herein.

The control circuit 1602 may store information in and/or retrieve information from the memory 1604. The memory 1604 may include a non-removable memory and/or a removable memory, as described herein.

The tracked device 1600 may include a communications circuit 1606 for transmitting and/or receiving information. The communications circuit 1606 may transmit and/or receive information via wired and/or wireless communications. The communications circuit 1606 may include a transmitter, an RF transceiver, or other circuit capable of performing wired and/or wireless communications. The communications circuit 1606 may be in communication with control circuit 1602 for transmitting and/or receiving information. Each of the modules within the control-source device 1500 may be powered by a power source 1610.

Although features and elements are described herein in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

The invention claimed is:

1. A load control system for controlling a plurality of lighting loads located in a space, the load control system comprising:
   a system controller configured to transmit messages for controlling one or more of the plurality of lighting loads via a wireless communication network; and
   a plurality of lighting control devices installed in the space, each of the plurality of lighting control devices configured to receive the messages from the system controller via the wireless communication network, and control at least one of the plurality of lighting loads in response to the message, each of the plurality of lighting control devices further configured to:
   receive beacon messages from a tracked device in the space, the beacon messages including a beacon identifier of the tracked device;
   measure a communication quality metric of each of the beacon messages;

determine, by processing the communication quality metrics of each of the beacon messages over a period of time, a processed communication quality metric for the tracked device; and transmit tracking data to the system controller, the tracking data including the beacon identifier of the tracked device and the processed communication quality metric;

wherein the system controller is further configured to receive the tracking data from each of the plurality of lighting control devices, and determine, based on processed communication quality metrics in the tracking data received from each of the plurality of lighting control devices, a location of tracked device with respect to one or more of the lighting control devices.

2. The load control system of claim 1, wherein the system controller is configured to determine the location of the tracked device via trilateration.

3. The load control system of claim 2, wherein the system controller is further configured to:
identify three or more lighting control devices that are closest to the tracked device; and
determine a distance between the tracked device and each of the three more lighting control devices that are closest to the tracked device.

4. The load control system of claim 3, wherein the system controller is further configured to:
retrieve x-y coordinates for each of the three or more lighting control devices that are closest to the tracked device;
calculate, based on the retrieved x-y coordinates for each of the three or more lighting control devices, a gradient function for the tracked device;
determine, using the gradient function, an estimated location of the tracked device; and
adjust the estimated location for the tracked device until a sign associated with the gradient function changes, wherein the determined location of the tracked device is the estimated location of the track device when the sign associated with the gradient function changes.

5. The load control system of claim 1, wherein the system controller is further configured to transmit the determined location of the tracked device, and wherein the load control system further comprises:
a network device configured to:
retrieve a floorplan for the load control system, wherein the floorplan includes coordinates for the plurality of load control devices,
determine, based on the locations for each of the one or more tracked devices, coordinates for each of the one or more tracked devices, and
display a representation of the floorplan for the load control system, wherein the representation comprises indications of the determined coordinates for each of the one or more tracked devices.

6. A system controller, comprising:
a communications circuit configured to communicate on a wireless communication network; and
a control circuit configured to:
communicate messages configured to control a plurality of lighting control devices,
receive tracking data from the plurality of lighting control devices, each tracking data including a beacon identifier of a respective tracked device and a processed communication quality metric;

identify, based on the tracking data, one or more tracked devices for which tracking data has been received; and
determine, based on the tracking data, a location, relative to at least one of the plurality of lighting control devices, for each of the one or more tracked devices for which tracking data has been received.

7. The system controller of claim 6, wherein the location for each of the one or more tracked devices for which tracking data has been received over the period of time is determined via trilateration.

8. The system controller of claim 6, wherein the control circuit being configured to determine the location for each of the one or more tracked devices further comprises the control circuit being configured to:
identify, for each of the one or more tracked devices, three or more lighting control devices that are closest to a respective tracked device of the one or more tracked devices; and
determine, for each of the one or more tracked devices, a distance between the respective tracked device and each of the three more lighting control devices that are closest to a respective tracked device.

9. The system controller of claim 8, wherein the control circuit being configured to determine the location for each of the one or more tracked devices further comprises the control circuit being configured to:
retrieve, for each of the one or more tracked devices, x-y coordinates for each of the three or more lighting control devices that are closest to the respective tracked device;
calculate, for each of the one or more tracked devices, a gradient function based on the retrieved x-y coordinates for each of the three or more lighting control devices that are closest to the respective tracked device;
determine, using the gradient function, an estimated location for each of the one or more tracked devices;
adjust the estimated location for each of the one or more tracked devices until a sign associated with the gradient function changes.

10. The system controller of claim 9, wherein the control circuit being configured to determine the location for each of the one or more tracked devices further comprises the control circuit being configured to:
determine, for each of the one or more tracked devices, a lighting control device of the one or more lighting control devices that is closest to a respective tracked device; and
retrieve, for each of the one or more tracked devices, a fixture location of a lighting fixture associated with the lighting control device that is closest to the respective tracked device, wherein a location of the respective tracked device is determined to be the retrieved fixture location of the lighting fixture associated with the lighting control device that is closest to the respective tracked device.

11. A lighting control device installed in a space, the lighting control device comprising:
a first communications circuit configured to receive beacon messages from a tracked devices;
a second communication circuit, wherein the second communications circuit is configured to transmit and receive messages on a wireless communication network; and
a control circuit configured to:

receive, via the second communication circuit, messages configured to control a corresponding electrical load;

control the corresponding electrical load in response to the messages;

receive beacon messages from a tracked devices in the space, each of the beacon messages comprising a beacon identifier for the tracked device;

measure a communication quality metric for each of the received beacon messages;

determine, based on the measured communication quality metric for each of the beacon messages received over a period of time, a processed communication quality metric for the tracked device; and transmit the tracking data to another device, wherein the tracking data includes the beacon identifier of the tracked device and the processed communication quality metric, wherein the tracking data is configured to enable the other device to determine a location of at least one of the one or more tracked devices.

12. The lighting control device of claim 11, wherein the processed communication quality metric is a maximum of the measured communication quality metric for each of the beacon messages received over the period of time.

13. The lighting control device of claim 12, wherein the control circuit is configured to determine a path loss value for the tracked device, wherein the determined path loss value is based on the maximum of the measured communication quality metric for each of the beacon messages received over the period of time, and wherein the transmitted tracking data further includes the path loss value of the tracked device.

14. The lighting control device of claim 12, wherein the control circuit is configured to determine a transmit power associated with the tracked device, and wherein the tracking data for the respective tracked device comprises the transmit power associated with the respective tracked device.

15. The lighting control device of claim 14, wherein each of the beacon messages further comprise the transmit power associated with the tracked device.

16. The lighting control device of claim 11, wherein the processed communication quality metric is an average of the measured communication quality metric for each of the beacon messages received over the period of time.

17. The lighting control device of claim 16, wherein the control circuit is configured to determine a path loss value for the tracked device, wherein the determined path loss value is based on the average of the measured communication quality metric for each of the beacon messages received over the period of time, and wherein the transmitted tracking data further includes the path loss value of the tracked device.

18. The lighting control device of claim 16, wherein the control circuit is configured to determine a transmit power associated with the tracked device, and wherein the tracking data for the respective tracked device comprises the transmit power associated with the tracked device.

19. The lighting control device of claim 18, wherein each of the beacon messages further comprise the transmit power associated with the tracked device.

20. A computer-readable medium having stored thereon instructions that, when executed by a control circuit, cause the control circuit to:

communicate messages configured to control a plurality of lighting control devices;

receive tracking data from the plurality of lighting control devices, each tracking data including a beacon identifier of a respective tracked device and a processed communication quality metric;

identify, based on the tracking data, one or more tracked devices for which tracking data has been received; and determine, based on the tracking data, a location, relative to at least one of the plurality of lighting control devices, for each of the one or more tracked devices for which tracking data has been received.

21. The computer readable medium of claim 20, wherein the control circuit being configured to determine the location for each of the one or more tracked devices further comprises the executable instructions causing the control circuit to:

identify, for each of the one or more tracked devices, three or more lighting control devices that are closest to a respective tracked device of the one or more tracked devices; and determine, for each of the one or more tracked devices, a distance between the respective tracked device and each of the three more lighting control devices that are closest to a respective tracked device.

22. The computer readable medium of claim 21, wherein the control circuit being configured to determine the location for each of the one or more tracked devices further comprises the executable instructions causing the control circuit to:

retrieve, for each of the one or more tracked devices, x-y coordinates for each of the three or more lighting control devices that are closest to the respective tracked device;

calculate, for each of the one or more tracked devices, a gradient function based on the retrieved x-y coordinates for each of the three or more lighting control devices that are closest to the respective tracked device;

determine, using the gradient function, an estimated location for each of the one or more tracked devices;

adjust the estimated location for each of the one or more tracked devices until a sign associated with the gradient function changes.

23. The computer-readable medium of claim 22, wherein the control circuit being configured to determine the location for each of the one or more tracked devices further comprises the executable instructions causing the control circuit to:

determine, for each of the one or more tracked devices, a lighting control device of the one or more lighting control devices that is closest to a respective tracked device; and retrieve, for each of the one or more tracked devices, a fixture location of a lighting fixture associated with the lighting control device that is closest to the respective tracked device, wherein a location of the respective tracked device is determined to be the retrieved fixture location of the lighting fixture associated with the lighting control device that is closest to the respective tracked device.

24. A computer-readable medium having stored thereon instructions that, when executed by a control circuit, cause the control circuit to:

receive, via a first communication circuit, messages configured to control a corresponding electrical load;

control the corresponding electrical load in response to the messages;

receive, via a second communication circuit, beacon messages from a tracked devices in a space, each of the beacon messages comprising a beacon identifier for the tracked device;

measure a communication quality metric for each of the received beacon messages;

determine, based on the measured communication quality metric for each of the beacon messages received over a period of time, a processed communication quality metric for the tracked device; and transmit the tracking data to another device, wherein the tracking data includes the beacon identifier of the tracked device and the processed communication quality metric, wherein the tracking data is configured to enable the other device to determine a location of at least one of the one or more tracked devices.

25. The computer-readable medium of claim 24, wherein the executable instructions further cause the control circuit to determine a path loss value for the tracked device, and wherein the transmitted tracking data further includes the path loss value of the tracked device.

26. A method comprising:

communicating messages configured to control a plurality of lighting control devices;

receiving tracking data from the plurality of lighting control devices, each tracking data including a beacon identifier of a respective tracked device and a processed communication quality metric;

identifying, based on the tracking data, one or more tracked devices for which tracking data has been received; and determining, based on the tracking data, a location, relative to at least one of the plurality of lighting control devices, for each of the one or more tracked devices for which tracking data has been received.

27. The method of claim 26, further comprising:

identifying, for each of the one or more tracked devices, three or more lighting control devices that are closest to a respective tracked device of the one or more tracked devices; and determining, for each of the one or more tracked devices, a distance between the respective tracked device and each of the three more lighting control devices that are closest to a respective tracked device.

28. The method of claim 27, further comprising:

retrieving, for each of the one or more tracked devices, x-y coordinates for each of the three or more lighting control devices that are closest to the respective tracked device;

calculating, for each of the one or more tracked devices, a gradient function based on the retrieved x-y coordinates for each of the three or more lighting control devices that are closest to the respective tracked device;

determining, using the gradient function, an estimated location for each of the one or more tracked devices;

adjusting the estimated location for each of the one or more tracked devices until a sign associated with the gradient function changes.

29. The method of claim 28, further comprising:

determining, for each of the one or more tracked devices, a lighting control device of the one or more lighting control devices that is closest to a respective tracked device; and retrieving, for each of the one or more tracked devices, a fixture location of a lighting fixture associated with the lighting control device that is closest to the respective tracked device, wherein a location of the respective tracked device is determined to be the retrieved fixture location of the lighting fixture associated with the lighting control device that is closest to the respective tracked device.

30. A method comprising:

receiving, via a first communication circuit, messages configured to control a corresponding electrical load;

controlling the corresponding electrical load in response to the messages;

receiving, via a second communication circuit, beacon messages from a tracked devices in a space, each of the beacon messages comprising a beacon identifier for the tracked device;

measuring a communication quality metric for each of the received beacon messages;

determining, based on the measured communication quality metric for each of the beacon messages received over a period of time, a processed communication quality metric for the tracked device; and transmitting the tracking data to another device, wherein the tracking data includes the beacon identifier of the tracked device and the processed communication quality metric, wherein the tracking data is configured to enable the other device to determine a location of at least one of the one or more tracked devices.

31. The method of claim 30, further comprising determining a path loss value for the tracked device, and wherein the transmitted tracking data further includes the path loss value of the tracked device.

* * * * *